US011070698B2

(12) United States Patent
Hirao

(10) Patent No.: US 11,070,698 B2
(45) Date of Patent: Jul. 20, 2021

(54) PRINTING APPARATUS AND METHOD OF CONTROLLING THE SAME THAT SELECTIVELY PERFORM PREDETERMINED IMAGE PROCESSING BASED ON A DETECTED SHEET SIZE

(71) Applicant: CANON KABUSHIKI KAISHA, Tokyo (JP)

(72) Inventor: Toyomi Hirao, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/390,772

(22) Filed: Apr. 22, 2019

(65) Prior Publication Data
US 2019/0246001 A1 Aug. 8, 2019

Related U.S. Application Data

(63) Continuation of application No. 15/358,892, filed on Nov. 22, 2016, now Pat. No. 10,321,007.

(30) Foreign Application Priority Data

Dec. 4, 2015 (JP) ................. 2015-237972

(51) Int. Cl.
*H04N 1/23* (2006.01)
*H04N 1/00* (2006.01)
(52) U.S. Cl.
CPC ......... *H04N 1/2323* (2013.01); *H04N 1/0057* (2013.01); *H04N 1/00713* (2013.01); *H04N 1/00771* (2013.01); *H04N 2201/0094* (2013.01)
(58) Field of Classification Search
CPC .................................. H04N 1/2323

USPC ........................................ 358/1.15
See application file for complete search history.

(56) References Cited

U.S. PATENT DOCUMENTS

| 5,001,574 | A | 3/1991 | Shimizu et al. |
| 5,321,486 | A | 6/1994 | Nanbu et al. |
| 6,339,483 | B1 | 1/2002 | Hoshino et al. |
| 6,876,824 | B2 * | 4/2005 | Maeda ............... G03G 15/5095 399/82 |
| 8,000,616 | B2 | 8/2011 | Teshima et al. |

(Continued)

FOREIGN PATENT DOCUMENTS

| CN | 10165604 A | 4/2008 |
| CN | 102314116 A | 1/2012 |

(Continued)

OTHER PUBLICATIONS

Japanese Office Action dated Sep. 24, 2019, in related Japanese Patent Application No. 2015-237972.
Chinese Office Action dated Jun. 3, 2020, in related Chinese Patent Application No. 201611086221.0 (with English translation).
Ohinese Office Action dated Jan. 6, 2021, in related Chinese Patent Application No. 201611086221.0.

*Primary Examiner* — Jacky X Zheng
(74) *Attorney, Agent, or Firm* — Venable LLP

(57) ABSTRACT

A printing apparatus includes an instruction unit configured to instruct a conveyance unit to convey a first sheet, and a detection unit configured to detect a size of the conveyed first sheet, the detected size being used for image processing for printing on a different sheet from the first sheet. The instruction unit is configured to instruct, before the detection unit detects the size of the first sheet, the conveyance unit to convey a sheet next to the first sheet.

21 Claims, 21 Drawing Sheets

(56) References Cited

U.S. PATENT DOCUMENTS

| | | | |
|---|---|---|---|
| 8,060,003 B2 | 11/2011 | Yoshizawa | |
| 8,204,426 B2 | 6/2012 | Shimizu | |
| 8,490,963 B2 | 7/2013 | Miyahara | |
| 8,577,277 B2 | 11/2013 | Yoshizawa | |
| 8,740,213 B2 | 6/2014 | Miyahara | |
| 9,260,259 B2 | 2/2016 | Miyahara | |
| 2005/0270556 A1* | 12/2005 | Shimamura | H04N 1/33369 |
| | | | 358/1.13 |
| 2007/0286614 A1* | 12/2007 | Teshima | G03G 15/5029 |
| | | | 399/16 |
| 2012/0001377 A1* | 1/2012 | Miyahara | B65H 3/44 |
| | | | 271/9.06 |
| 2013/0133734 A1 | 5/2013 | Peter et al. | |
| 2015/0055148 A1* | 2/2015 | Onishi | H04N 1/393 |
| | | | 358/1.2 |

FOREIGN PATENT DOCUMENTS

| | | |
|---|---|---|
| CN | 104427166 A | 3/2015 |
| JP | S59-67764 A | 4/1984 |
| JP | 3227187 B2 | 6/1993 |
| JP | H05-162873 A | 6/1993 |
| JP | H11-98314 A | 4/1999 |
| JP | 2004-004622 A | 1/2004 |
| JP | 2008-020902 A | 1/2008 |
| JP | 2008-122935 A | 5/2008 |
| JP | 2009-177529 A | 8/2009 |
| JP | 2012-012179 A | 1/2012 |

* cited by examiner

FIG. 4A

| CONTROL ID | PRINT PAGE ID | SHEET SIZE (X) | SHEET SIZE (Y) | ..... |
|---|---|---|---|---|
| 401 | 402 | 403 | 404 | |

FIG. 4B

| CONTROL ID | TYPE OF CONTROL |
|---|---|
| 1 | SHEET FEED INSTRUCTION |
| 2 | SHEET FEEDING END NOTIFICATION |
| 3 | PRINT START INSTRUCTION |
| 4 | SHEET DISCHARGE NOTIFICATION |
| 5 | SHEET SIZE NOTIFICATION |

F I G. 6
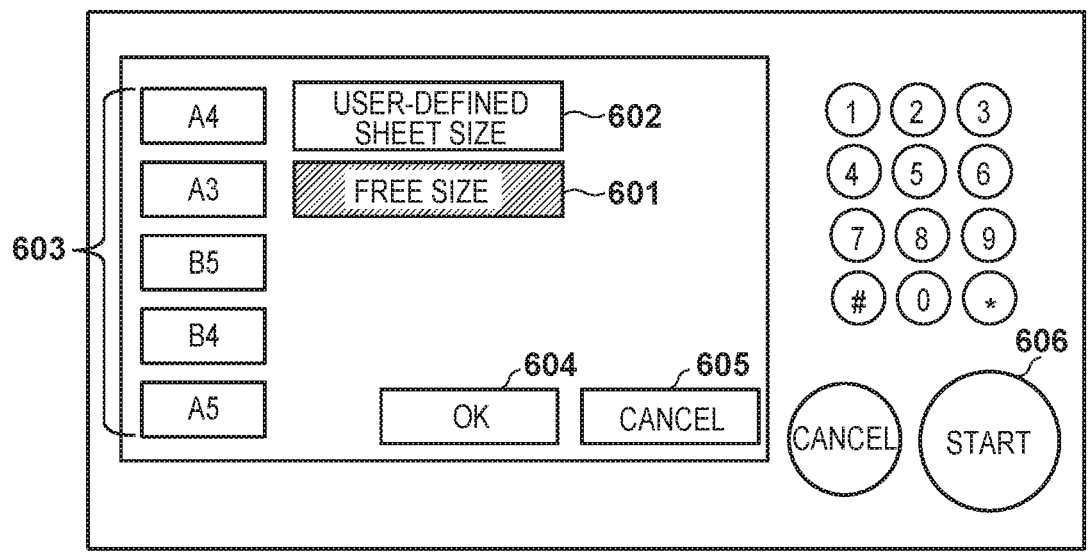
F I G. 7
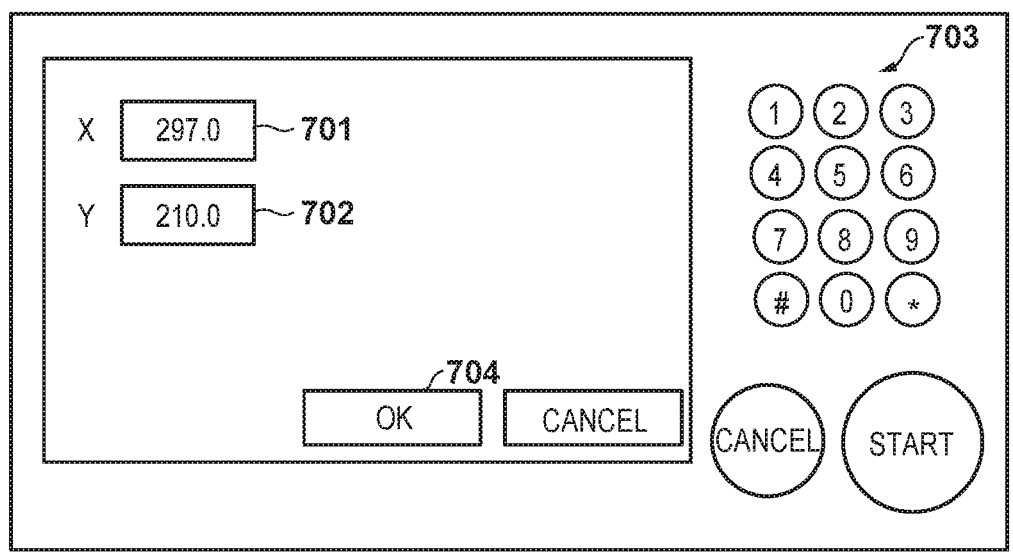

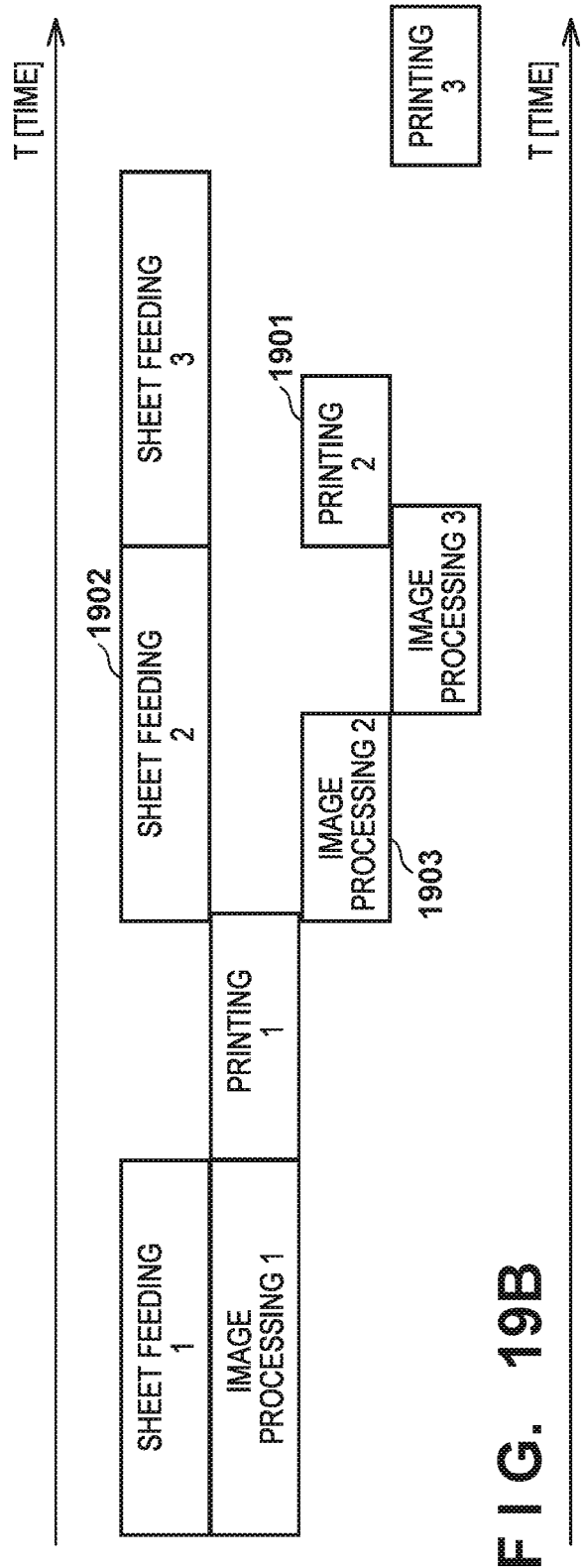
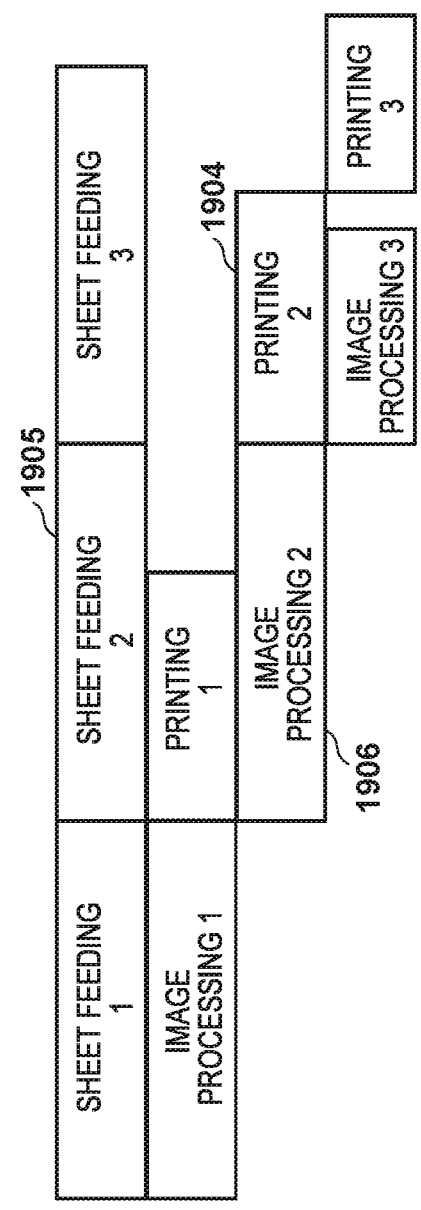

PRINTING APPARATUS AND METHOD OF CONTROLLING THE SAME THAT SELECTIVELY PERFORM PREDETERMINED IMAGE PROCESSING BASED ON A DETECTED SHEET SIZE

This application claims the benefit of U.S. patent application Ser. No. 15/358,892, filed on Nov. 22, 2016, which claims the benefit of Japanese Patent Application No. 2015-237972, filed Dec. 4, 2015, both of which are hereby incorporated by reference herein in their entireties.

BACKGROUND OF THE INVENTION

Field of the Invention

The present invention relates to a printing apparatus, a method of controlling the printing apparatus, and a storage medium.

Description of the Related Art

A conventional image forming apparatus has a plurality of print modes for executing print processing, and the print modes include a "standard sheet size print mode," in which the size of sheets is automatically recognized by a sheet feeding unit of the image forming apparatus, and print processing is performed according to the recognized sheet size. The print modes also include a "user-defined sheet size print mode" (also referred to as non-standard sheet size print mode) that requires a user to set the size of sheets placed on a manual feed tray before printing in the case in which the size of sheets to be used for printing cannot be detected in advance, such as manual feed printing. Because the user-defined sheet size print mode requires the user to input the size of sheets to be used for printing, in order to solve the problem of imposing a burden on the user, some image forming apparatuses have a "free size print mode" that eliminates the need of the user to designate the size of sheets. Japanese Patent No. 3227187 proposes a control method of controlling an image forming apparatus wherein, in the case of the free size print mode, print processing is performed on the first sheet of paper during which the size of the first sheet is recognized based on the paper feeding speed, and the result of detection performed by a sensor, provided along a conveyance path so as to determine the sheet size, and the sheet size recognized during printing on the first sheet, is used to perform print processing on the second and subsequent sheets.

In order to carry out the print processing described in Japanese Patent No. 3227187, it is necessary to delay the timing of issuing an instruction to start a sheet feed operation for feeding the second sheet and the timing of the start of processing on image data to be printed on the second sheet until the result of recognition of the size of the first sheet is obtained after the printing processing on the first sheet has been finished. For this reason, there is a problem in that, in the print processing on the second and subsequent sheets, a sheet feeding start instruction is transmitted late to the sheet feeding unit, which increases the time required until completion of printing of an image on the second sheet. In addition, image data to be printed on the second and subsequent sheets need to be processed according to the result of recognition of the size of the first sheet, and an image processing unit that performs image processing may have to perform trimming on the image data depending on the recognized sheet size. In this case, if the image processing unit does not have an image trimming function, the control method described in the patent literature is problematic in that it is not possible to designate the free size print mode.

SUMMARY OF THE INVENTION

An aspect of the present invention is to eliminate the above-mentioned problems with conventional technology.

A feature of the present invention is to provide a technique with which printing of images on the second and subsequent sheets can be executed without delaying the start of printing even in a print mode that does not require designation of the size of sheets to be used for printing.

According to a first aspect, the present invention provides a printing apparatus comprising an instruction unit configured to instruct a conveyance unit to convey a first sheet, and a detection unit configured to detect a size of the conveyed first sheet, the detected size being used for image processing for printing on a different sheet from the first sheet, wherein the instruction unit is configured to instruct, before the detection unit detects the size of the first sheet, the conveyance unit to convey a sheet next to the first sheet.

According to a second aspect, the present invention provides a printing apparatus comprising a detection unit configured to detect a size of a sheet conveyed through a conveyance path in the printing apparatus, an image processing unit configured to process and to render image data to be printed, a control unit configured to perform control so as, in a print mode in which a size of a sheet to be used for printing is not designated, to cause the image processing unit to render the image data to be printed to image data of a predetermined size of sheet until the size of the sheet to be used for printing is detected by the detection unit, and, after the size of the sheet to be used for printing is detected by the detection unit, to cause the image processing unit to render the image data to be printed to image data corresponding the size of the sheet detected by the detection unit, and a print unit configured to print an image on a sheet conveyed via the conveyance path according to the image data processed and rendered by the image processing unit.

According to a third aspect, the present invention provides a control method of controlling a printing apparatus, the method comprising detecting a size of a sheet conveyed through a conveyance path in the printing apparatus, performing image processing of processing and rendering image data to be printed, performing control so as, in a print mode in which a size of a sheet to be used for printing is not designated, to render the image data to be printed to image data of a predetermined size in the image processing until the size of the sheet to be used for printing is detected in the detecting, and, after the size of the sheet to be used for printing is detected in the detecting, to render the image data to be printed to image data having the size of the sheet detected in the detecting, and printing an image on a sheet conveyed via the conveyance path according to the image data processed and rendered in the image processing.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 4A and 4B are diagrams for describing the data structure of a control command exchanged between the engine controller and a print processing module shown in FIG. 3.

FIG. 6 shows an example of a sheet size settings screen displayed on a console unit in the MFP according to the first embodiment.

FIG. 7 shows an example of a sheet size input screen displayed on the console unit included in the image forming apparatus according to the first embodiment.

FIGS. 19A and 19B are timing charts for comparison between print control according to the first embodiment and print control according to a conventional technique.

DESCRIPTION OF THE EMBODIMENTS

Embodiments of the present invention will be described hereafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
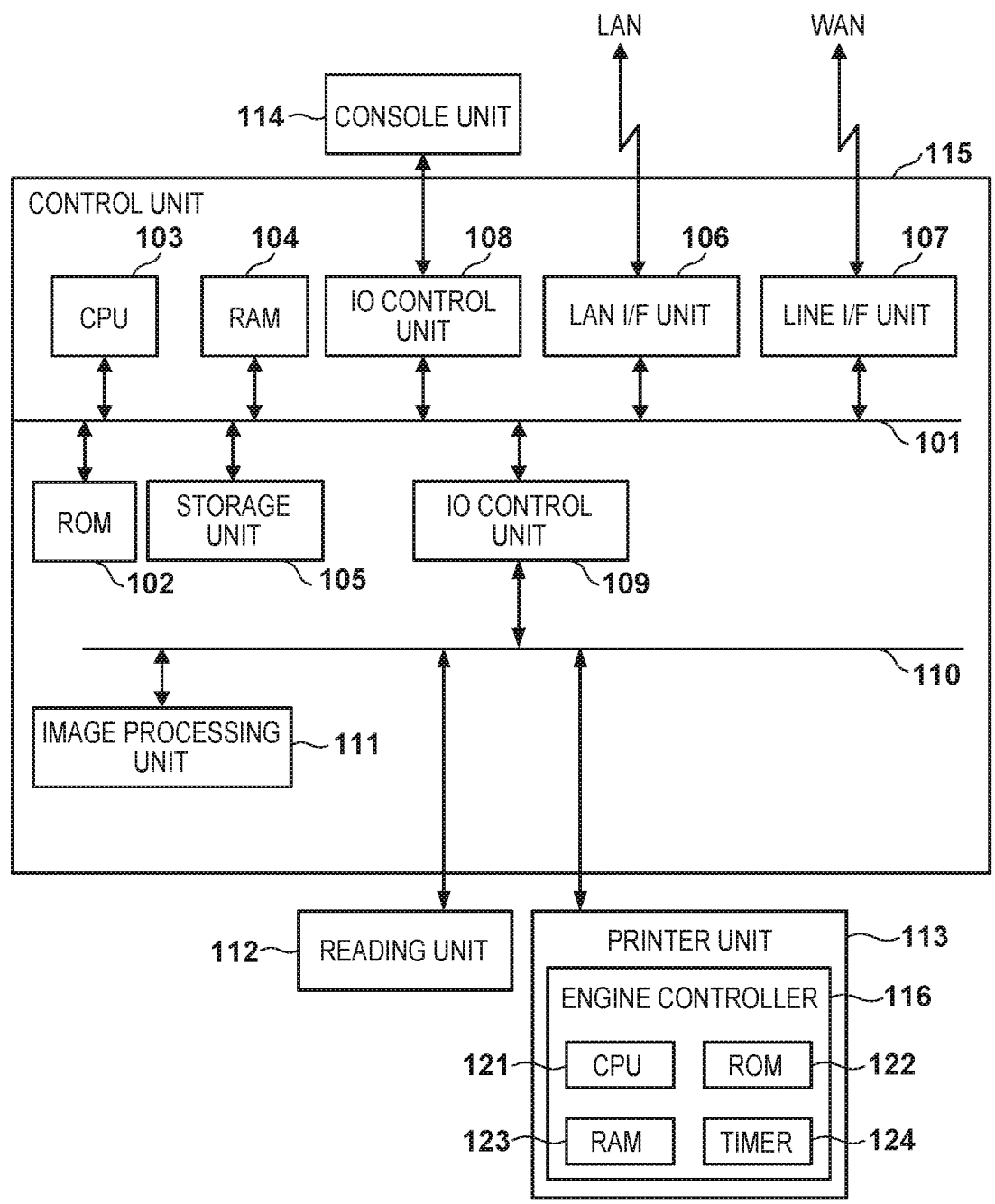
FIG. 1 is a block diagram for describing a configuration of an image forming apparatus (or a multi-function peripheral (MFP)), which is an example of a printing apparatus according to a first embodiment of the present invention.

FIG. 1 is a block diagram for describing a configuration of an image forming apparatus, which is an example of a printing apparatus according to a first embodiment of the present invention. Here, the present invention will be described by using, as the image forming apparatus, for example, a multi-function peripheral (MFP) that can read an original by using a reading unit, and execute printing, and the like, but the image forming apparatus according to the present invention may be a printing apparatus having a print function alone.

A control unit 115 controls overall operations of the image forming apparatus. The control unit 115 includes a system bus 101 and an image bus 110. A read only memory (ROM) 102 includes a boot program stored therein. When the apparatus is powered on, a central processing unit (CPU) 103 executes the boot program, and deploys an operating system (OS) and a program stored in a storage unit 105 into a random-access memory (RAM) 104. Then, as a result of the CPU 103 executing the program deployed into the RAM 104, the overall operations of the apparatus are executed. Also, the RAM 104 provides a work memory for the CPU 103 to execute a program, and is used as an image memory for temporarily storing image data when processing the image data. The storage unit 105 is, for example, a large-capacity memory, such as a hard disk or a solid state drive (SSD) memory, and stores therein various types of programs, image data, and the like, input from a reading unit 112. A local area network (LAN) interface (I/F) unit 106 is an interface unit for connecting to a LAN, and performs input and output of information into and from the devices connected via the LAN. An input/output (IO) control unit 108 is an interface unit for interfacing with a console unit 114, and has a function of outputting image data, to be displayed on the console unit 114, to the console unit 114, and transmitting information input by a user through the console unit 114 to the CPU 103. The console unit 114 includes a display unit having a touch panel function, a keypad, and the like, and interfaces with the user by interpreting a video graphics array (VGA) signal supplied via the IO control unit 108 and displaying images, characters, and the like, on the display unit. A line I/F unit 107 is connected to a wide area network (WAN) so as to perform communication. Also, an IO control unit 109 is a bus bridge that connects the system bus 101 and the image bus 110 that transfers image data at a high speed and converts the data structure of the system bus 101. The processing units described above are provided on the system bus 101.

The image bus 110 is a general-purpose bus, such as a peripheral component interconnect (PCI) bus, an Institute of Electrical and Electronics Engineers (IEEE) 1394, or a PCI Express (PCIEx). The image bus 110 is connected to the reading unit 112 including a scanner, a printer unit 113, and an image processing unit 111. The IO control unit 109 performs conversion of image data between synchronous and asynchronous systems. A communication bus is also connected between the printer unit 113 and the reading unit 112, the communication bus being for exchanging control commands for carrying out control operations of controlling the printer unit 113 and the reading unit 112 that are issued from the control unit 115. The communication bus is implemented by using a universal asynchronous receiver-transmitter (UART) (RS232C), a general-purpose communication protocol, such as universal serial bus (USB), or a dedicated communication protocol. The image processing unit 111 performs image processing on input image data and output image data, such as resolution conversion, compression/decompression, binary to multi-valued conversion, and trimming. Also, the image processing unit 111 receives image data from the reading unit 112, and performs control so as to transfer the received image data to the RAM 104 via the image bus 110 and the system bus 101. The image processing unit 111 is implemented by image processing application specific integrated circuits (ACISs) (hardware) and software, which is run on the CPU 103 that controls the image processing ASICs so as to perform processing operations. The image processing ASICs each include a register for setting a data format for data to be processed and the content of processing, and the image processing unit 111 performs image processing by making settings in the register of the image processing ASIC through control software run on the CPU 103.

The printer unit 113 includes, for example, a printer engine according to an electrophotographic method, and an engine controller 116 controls the printer engine and prints an image according to the image data received from the control unit 115. The engine controller 116 includes a CPU 121, a ROM 122, a RAM 123, and a timer 124. The CPU 121 controls the engine controller 116 by executing a program stored in the ROM 122 and using the RAM 123 as a work memory. The timer 124 starts measuring time in response to an instruction from the CPU 121, and notifies the CPU 121 of the measured time.

Figure 2:
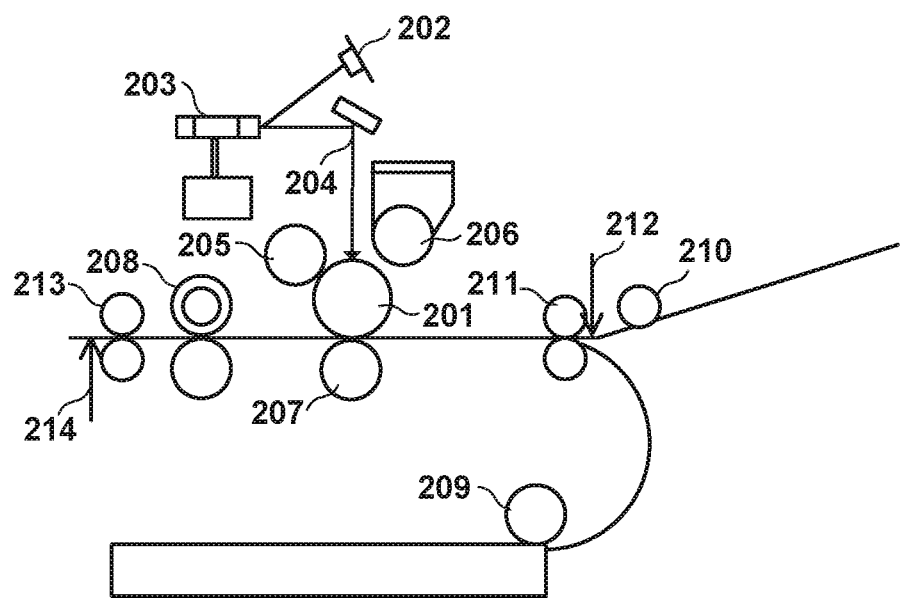
FIG. 2 is a block diagram for describing a schematic configuration of a printer unit included in the MFP according to the first embodiment.

FIG. 2 is a block diagram for describing a schematic configuration of the printer unit 113 included in the MFP according to the first embodiment.

Laser light 204 emitted from a semiconductor laser 202 that is a light source is reflected by a rotating polygonal mirror 203 so as to scan a photosensitive drum 201 and to form an electrostatic latent image corresponding to the image data on the photosensitive drum 201. A charging roller 205 causes the surface of the photosensitive drum 201 to be uniformly charged. A developing unit 206 develops the electrostatic latent image formed on the photosensitive drum 201 by using toner. A transfer roller 207 transfers the developed toner image on the photosensitive drum 201 onto a sheet. A fixing roller 208 fuses the toner transferred onto the sheet so as to fix the toner on the sheet. A feeding roller 209 conveys a sheet from a cassette whose sheet size is identifiable to a conveyance path. A manual feed roller 210 conveys a sheet from a manual feed slot to the conveyance path. A registration roller 211 straightens out a skewed fed sheet by causing the leading edge of the fed sheet to come into contact therewith, and synchronizes the writing of image data onto the photosensitive drum 201 and the conveyance of a sheet. A registration sensor 212 is used to detect the leading edge of a fed sheet and to measure a length in a conveyance direction of the manually fed sheet. A discharge roller 213 discharges a sheet having an image fixed thereon. A discharge sensor 214 detects whether the sheet having an image fixed thereon has been discharged outside the apparatus.

Also, in FIG. 2, the distance from the registration sensor 212 to the photosensitive drum 201, which is the transfer position at which transfer takes place, is different from that in the actual apparatus. The printer unit 113 is connected to the control unit 115, and performs a printing operation by receiving control commands, such as a sheet feed instruction and a print instruction, from the control unit 115. The printer unit 113 receives image data output from the image processing unit 111 included in the control unit 115 via the image bus 110 according to image size information included in a sheet feed instruction and a print instruction. The printer unit 113 forms an electrostatic latent image by controlling the semiconductor laser 202 to emit or not to emit light according to the received image data, and forms an image on a sheet through processes, such as a developing process and a transfer process.

Here, the printer unit 113 has been described as a monochrome printer having one laser beam source, one photosensitive drum, and one developing unit. This is for simplifying the description. Alternatively, the printer unit 113 may be, for example, an image forming apparatus including a color printer engine composed of a plurality of the aforementioned constituent members. As described above, the printer unit 113 includes the engine controller 116 for performing control so as to perform printing by using information from the rollers and the sensors shown in FIG. 2. The engine controller 116 includes motor controllers for causing the rollers to rotate, a thermistor for controlling the temperature of the fixing roller, and the like. Also, the engine controller 116 controls the mechanism of the printer unit 113 described above, controls the constituent members according to the commands from the control unit 115, such as a sheet feed instruction and a print instruction, and controls a sheet feed operation, a print operation, and the like.

Figure 3:
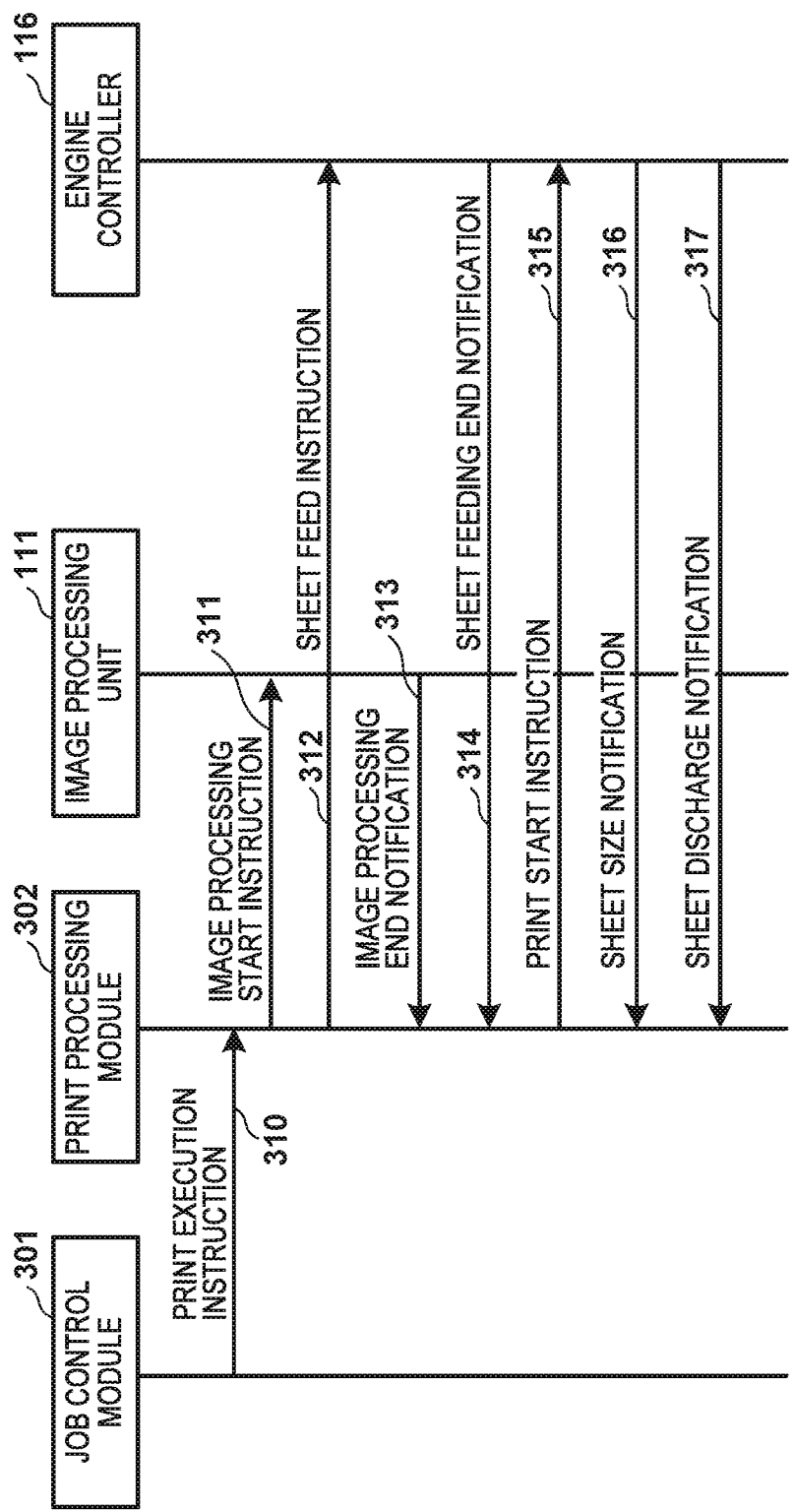
FIG. 3 is a diagram for describing a sequence of exchanging control commands between an engine controller and functional units implemented by a program of the MFP according to the first embodiment.

FIG. 3 is a diagram for describing a sequence of exchanging control commands between the engine controller 116 and functional units implemented by a program of the MFP according to the embodiment.

The functional units are implemented by the CPU 103 included in the control unit 115 executing a program deployed into the RAM 104, and include a job control module 301 and a print processing module 302. As described above, the image processing unit 111 is implemented by image processing ASICs (hardware) and software, which is run on the CPU 103 that controls the image processing ASICs. Here, it is assumed that the job control module 301, the print processing module 302, and the image processing unit 111 are composed of modules of an application that runs on the control unit 115, but they may, of course, be implemented by hardware.

If the user of the MFP provides an instruction to perform copy processing with the sheet size being set to free size, the reading unit 112 reads an original, and, thereafter, a print execution instruction 310 is issued from the job control module 301 to the print processing module 302. The print execution instruction 310 is issued, with an image identification (ID) associated with the original as the identifier. The print processing module 302 that has received the print execution instruction 310 issues an image processing start instruction 311 to the image processing unit 111, and also issues a sheet feed instruction 312 to the engine controller 116. As a result, the image processing unit 111 performs image processing on the image data to be printed, such as gamma processing and half-toning, and after the image processing ends, issues an image processing end notification 313 to the print processing module 302. The image processing time required at this time depends on the area (width× length of the original) of the image to be printed.

When the engine controller 116 receives the sheet feed instruction 312, the engine controller 116 starts a sheet feed operation, and, when the sheet feed operation ends, the engine controller 116 issues a sheet feeding end notification 314 to the print processing module 302.

When the print processing module 302 receives the sheet feeding end notification 314 and the image processing end notification 313 that are for the page to be printed, the print processing module 302 issues a print start instruction 315 to the engine controller 116. As a result, the engine controller 116 transmits a synchronization signal for image data output to the control unit 115. The control unit 115 that has received the synchronization signal outputs image data to the printer unit 113. The engine controller 116 that has received the image data prints an image on a sheet according to the image data. When the printed sheet is discharged after printing, the engine controller 116 issues a sheet discharge notification 317 to the print processing module 302. In addition to the sheet discharge notification 317, the engine controller 116 also issues, where necessary, a sheet size notification 316 indicating the sheet size identified during execution of printing to the print processing module 302. Print processing is executed as a result of the above-described processing sequence being executed by control applications of the engine controller 116 and the control unit 115.

FIGS. 4A and 4B are diagrams for describing the data structure of a control command exchanged between the print processing module 302 and the engine controller 116 shown in FIG. 3.

FIG. 4A shows a view illustrating an example of the data structure of a control command. As a result of the control command being exchanged between the engine controller 116 and the control unit 115, the functional units described above perform operations. Control ID 401 is an identifier for identifying a control command. The control ID 401 and various types of control commands are shown in FIG. 4B. Print page ID 402 is an identifier for identifying a page to be printed that is uniquely assigned to the page to be printed. Here, in order to speed up the print operation, control commands, such as a sheet feed instruction, a print start instruction, a sheet feeding end notification and a sheet discharge notification are issued in control over a plurality of pages. For this reason, the print page ID 402 is provided to identify for which page to be printed the control command is provided. Sheet size (X) 403 and sheet size (Y) 404 are sheet size information regarding the size of a sheet on which printing is to be performed. The sheet size (X) 403 indicates a length in a direction vertical to the conveyance direction of the sheet, and the sheet size (Y) 404 indicates a length in the conveyance direction of the sheet.

In the first embodiment, processing with respect to the sheet size (Y) 404 that is relevant to the time required to convey a sheet will be described. The size in the sheet size (Y) 404 is set by a unit of 1 mm and is notified, but a specific numerical value (for example, 0 mm, 1000 mm, or the like) may also be used as the sheet size designating free size printing. The numerical value may be a numerical value that has been set in advance in both of the engine controller 116 and the control unit 115, or may be dynamically determined between the control unit 115 and the engine controller 116.

Next, sheet size determining processing performed in the MFP according to the first embodiment will be described with reference to FIG. 5.

Figure 5:
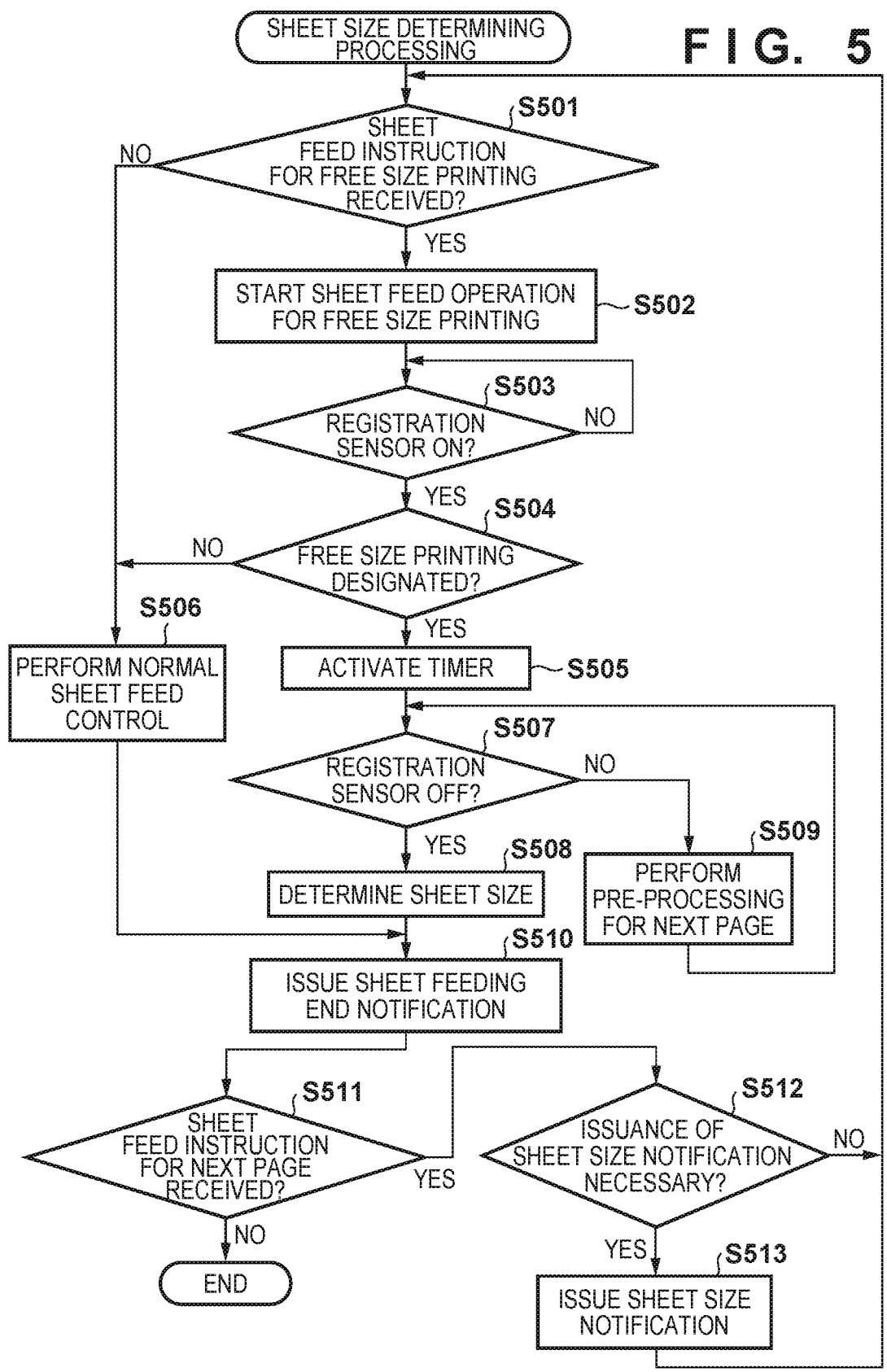
FIG. 5 is a flowchart for describing sheet size determining processing performed by the engine controller included in the MFP according to the first embodiment.

FIG. 5 is a flowchart for describing sheet size determining processing performed by the engine controller 116 included in the MFP according to the first embodiment. The processing shown in the flowchart is achieved by the CPU 121 executing a program for executing the processing stored in the ROM 122.

The processing starts upon receiving the sheet feed instruction 312 from the print processing module 302. First, in step S501, the CPU 121 obtains sheet size (Y) 404 information included in the sheet feed instruction 312. Then, the CPU 121 determines whether the obtained sheet size (Y) 404 information indicates the size (for example, 0 mm or 1000 mm) designating free size printing (manual feed printing). If it is determined that the information indicates the size designating free size printing, the procedure proceeds to step S502. If it is determined that the information does not indicate the size designating free size printing, the procedure proceeds to step S506, where a normal sheet feed operation is performed. After that, the procedure proceeds to step S510.

In step S502, the CPU 121 turns on a flag of the RAM 123 that indicates free size printing and performs a sheet feed operation for free size printing. To be specific, the CPU 121 causes the manual feed roller 210 to rotate so as to convey a sheet placed on the manual feed tray. The manual feed roller 210 is rotated until the output of the registration sensor 212 is turned on in step S503 and the leading edge of the conveyed sheet is detected. Then, when the output of the registration sensor 212 is turned on in step S503, the procedure proceeds to step S504, where it is again determined, based on the flag turned on in step S502, whether a sheet feed instruction for free size printing has been received. If it is determined that a sheet feed instruction for free size printing has not been received, the procedure proceeds to step S506. If, on the other hand, it is determined that a sheet feed instruction for free size printing has been received, the procedure proceeds to step S505. In step S505, in order to measure the length in the conveyance direction of the conveyed sheet, the CPU 121 starts measuring time by using the timer 124. Then, the procedure proceeds to step S507, where the CPU 121 determines whether the registration sensor 212 has detected a no-sheet state, or, in other words, it is determined whether a sheet has passed through the position of the registration sensor 212 and the output of the sensor has been off. If it is determined that the output of the sensor has been on, the procedure proceeds to step S509, where conveyance pre-processing for conveying a sheet for use in printing the next page is executed. Then, the procedure proceeds to step S507. The conveyance pre-processing in step S509 is processing for reducing the time required for a sheet to reach the position of the registration sensor 212 by conveying the sheet antecedently if a sheet feed instruction 312 for the next page has already been received. Through execution of the conveyance pre-processing, the earlier a sheet feed instruction 312 for the next page is received, the faster the sheet feed processing after the previous page can be. Accordingly, the performance is improved. For this reason, in step S509, if the sheet feed instruction 312 for the next page has not been received, the procedure proceeds to step S507 without any processing being performed. Then, if it is detected in step S507 that the output of the registration sensor 212 has been off, the procedure proceeds to step S508. In step S508, the CPU 121 determines the length in the conveyance direction of the sheet based on the time measured by the timer 124 at that time and the sheet conveyance speed that is dependent on the rotation speed of the manual feed roller 210, and stores the determined length in the conveyance direction of the sheet in the RAM 123. Then, the procedure proceeds to step S510. If, in step S508, the difference between the determined length and the previously determined sheet size stored in the RAM 123 is a predetermined value or less, the CPU 121 determines that it is a measurement error, and does not update the sheet size stored in the RAM 123. If there is no sheet size stored in the RAM 123, the sheet size determined in step S508 is stored in the RAM 123.

In step S510, the CPU 121 issues, to the control unit 115, the sheet feeding end notification 314 indicating that sheet feeding has been completed. Next, the procedure proceeds to step S511, where the CPU 121 determines whether the sheet feed instruction 312 for the next page has been received from the control unit 115. If it is determined that the sheet feed instruction 312 for the next page has not been received, the processing ends. If, on the other hand, it is determined that the sheet feed instruction 312 for the next page has been received, the procedure proceeds to step S512. In step S512, the CPU 121 determines whether or not it is necessary to issue the sheet size notification 316. The determination is made based on, for example, whether the sheet size notification 316 has not been issued at all or whether sheet size information that is different from the sheet size notified previously was stored in the RAM 123 in step S508. If it is determined here that it is necessary to issue the sheet size notification 316, the procedure proceeds to step S513, where the CPU 121 issues the sheet size notification 316 to the control unit 115. The sheet size notification 316 is a control command in which "5" is set in the control ID 401 and the sheet size determined in step S508 is set in the sheet size (Y) 404. Also, in the control command, the print page ID contained in the sheet feed instruction 312 received when the sheet feed operation of determining sheet size was started is set in the print page ID 402 of the sheet size notification 316. After the sheet size notification 316 has been issued as described above, the procedure returns to step S501 so as to process the subsequent page.

Through the processing described above, at the time of free size printing, if an instruction to perform printing on the next sheet is received after the first sheet has been fed, the engine controller 116 notifies the control unit 115 of the sheet size of the first sheet and executes print and sheet feed operations. Also, if a sheet feed instruction for the subsequent page is received before printing on the currently printed sheet ends, the feeding of a sheet used for printing the next page can be promptly started, and it is therefore possible to improve the printing speed.

FIG. 6 shows an example of a sheet size settings screen displayed on the console unit 114 in the MFP according to the first embodiment. The processing operations, such as providing display on the screen of the console unit 114 and execution of a print operation in response to the issuance of a control command to the engine controller 116, are implemented primarily by the CPU 103 included in the control unit 115 executing a program.

A free size button 601 is pressed by the user to provide an instruction to perform free size printing (here, manual feed printing). A user-defined sheet size button 602 is a button for the user to input a specific sheet size. When the button 602 is pressed by the user, a sheet size input screen shown in FIG. 7 is displayed. Standard sheet size buttons 603 are buttons for designating standard sheet sizes, such as A3, A4, A5, B4 and B5. When one of the buttons 601 to 603 is selected, the selected button is highlighted. FIG. 6 shows a state in which the free size button 601 has been selected. An OK button 604 is a button for confirming a selection made by the user on the screen, and a cancellation button 605 is a button for cancelling the selection made by the user on the screen and switching the current screen to the previous screen. Here, because the free size button 601 has already been pressed in FIG. 6, when the OK button 604 is pressed, the MFP performs the operation in the free size print mode. Note that the sheet size and the print mode that have been set on this screen and the screen shown in FIG. 7 are stored in the RAM 104.

FIG. 7 shows an example of a sheet size input screen displayed on the console unit 114 included in the image forming apparatus according to the first embodiment.

Printing can be performed on a sheet of a desired sheet size by inputting values in X direction length 701 and Y direction length 702 through a numeric keypad 703 and, thereafter, pressing an OK button 704. The sheet size input screen as shown in FIG. 7 for specifying a user-defined sheet size is not displayed if free size printing or standard sheet size printing is designated on the screen shown in FIG. 6 by the user.

Hereafter, in the first embodiment, free size printing will be described by taking, for example, a copy operation in which the reading unit 112 reads an original and the printer unit 113 performs printing. Note that, however, the basic operation of the free size printing is the same even when printing is performed based on image data received from a host computer via the LAN I/F unit 106. Here, the user places an original on the reading unit 112, and, thereafter, provides, to the MFP, an instruction to start reading the original and printing by pressing a start key 606 (FIG. 6) of the console unit 114. At this time, prior to the start of reading the original, the control unit 115 first determines the image size of the original to be read according to the designation of the print operation mode.

Figure 8:
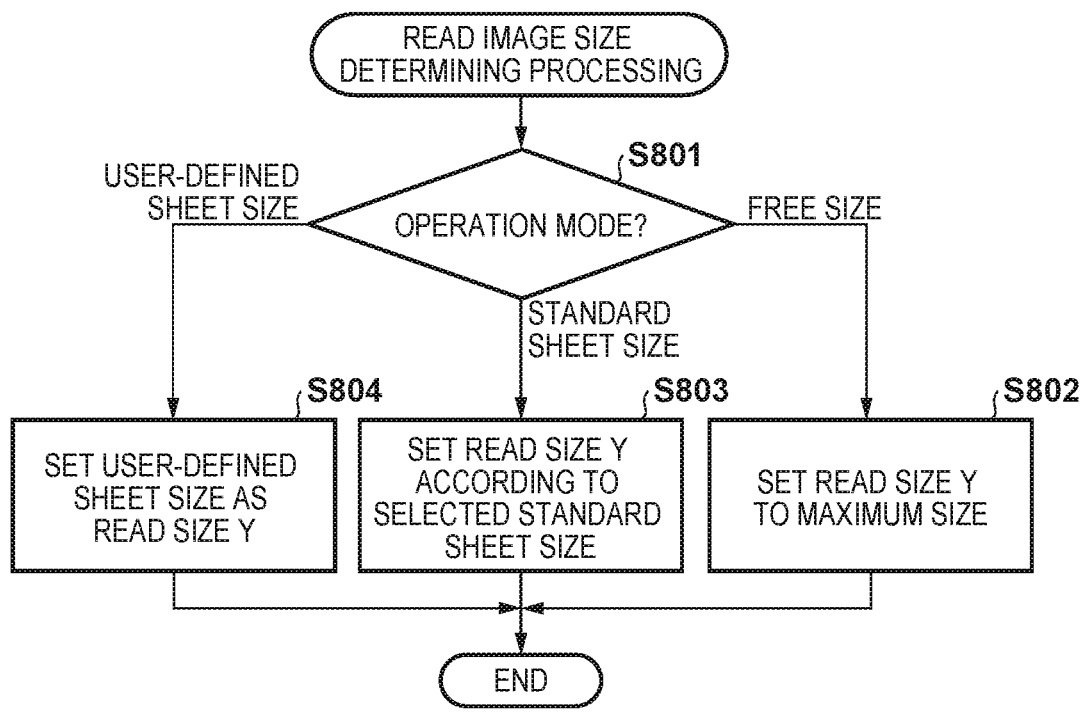
FIG. 8 is a flowchart for describing read image size determining processing performed when a copy operation is executed in the MFP according to the first embodiment.

FIG. 8 is a flowchart for describing read image size determining processing performed when a copy operation is executed in the MFP according to the first embodiment. The processing shown in the flowchart is achieved by the CPU 103 executing a program deployed from the storage unit 105 into the RAM 104.

First, in step S801, the CPU 103 determines the print mode that has been designated by the user via the screen shown in FIG. 6 and is stored in the RAM 104. In the first embodiment, the length in the Y direction of the sheet, which is in parallel to the conveyance direction, is important. Accordingly, the following description will be given by using the length in the Y direction of the sheet, and a description by using the length in the X direction, which is vertical with respect to the conveyance direction, will not be given. If the CPU 103 determines in step S801 that the free size print mode has been designated, the procedure proceeds to step S802, where the read size (Y) is set to a maximum size (predetermined size). The maximum size set here is basically determined according to the printable maximum size that can be printed by the printer unit 113. Here, it is assumed that the printable maximum size is, for example, 630 mm.

If, on the other hand, the CPU 103 determines in step S801 that the standard sheet size print mode has been designated, the procedure proceeds to step S803, where one of the pre-set standard sheet sizes is set as the read size (Y) according to the standard sheet size selected by the user on the screen as shown in FIG. 6. Here, the read size (Y) according to the standard sheet size is held by the program executed by the CPU 103. The read size (Y) according to the standard sheet size is not necessarily held by the program, and may be stored in the RAM 104.

Also, if the CPU 103 determines in step S801 that the user-defined sheet size print mode has been designated, the procedure proceeds to step S804, where the size designated by the user is set as the read size (Y). The size designated by the user is the length (size) input in the Y direction length 702 on the screen shown in FIG. 7.

In steps S802 to S804, the CPU 103 provides an instruction to read the original to the reading unit 112 based on the read size (Y) determined in the manner described above and then receives, via the image bus 110, image data obtained as a result of the original being read. In this way, the CPU 103 causes the image processing unit 111 to perform image processing on the received image data and, thereafter, stores the processed image data in the storage unit 105 as image data. Also, at this time, attribute information is assigned to each image data.

In a case in which the image data obtained as a result of an image being read by setting the read size (Y) to the maximum size in the free size print mode is printed on, for example, a A4-sized sheet, the starting point from which the original was read matches the starting point from which the original is printed on the sheet. Accordingly, if the size of the image data obtained through reading in the maximum size is within A4 size, the original is printed on the A4-sized sheet without problem.

Figure 9:
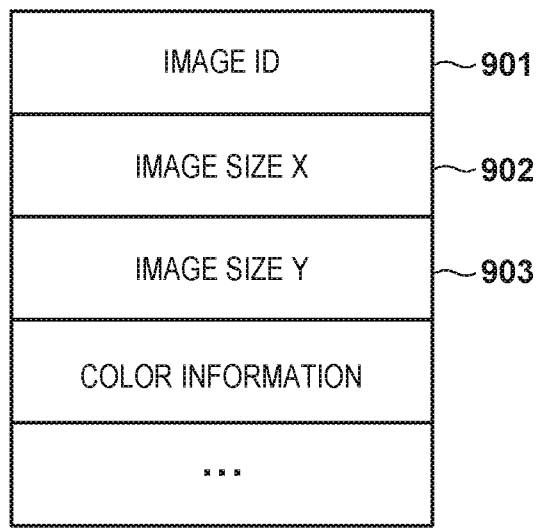
FIG. 9 is a diagram for describing attribute information of image data stored in a storage memory included in the image forming apparatus according to the first embodiment.

FIG. 9 is a diagram for describing attribute information of image data stored in the storage unit 105.

The attribute information primarily includes an image ID 901, an image size X 902, an image size Y 903, and color information. As the image size Y 903, the read size Y determined in any one of steps S802, S803, and S804, shown in FIG. 8, is set. Also, ID information for identifying each image data when the MFP performs processing is uniquely assigned to the image data and is stored as the image ID 901 irrespective of the reading operation and the printing operation. Also, at the time of reading an original, one ID is assigned to one sheet of the original, and the ID is set as the image ID 901 in the attribute information. At the time of printing, the image ID 901 in the attribute information is associated with the print page ID 402 in the control command so as to perform print control. In the first embodiment, for the sake of simplifying the description, it is assumed that three sheets of originals are read by the reading unit 112 and the images on the sheets of the original are printed in the free size print mode.

Figure 10:
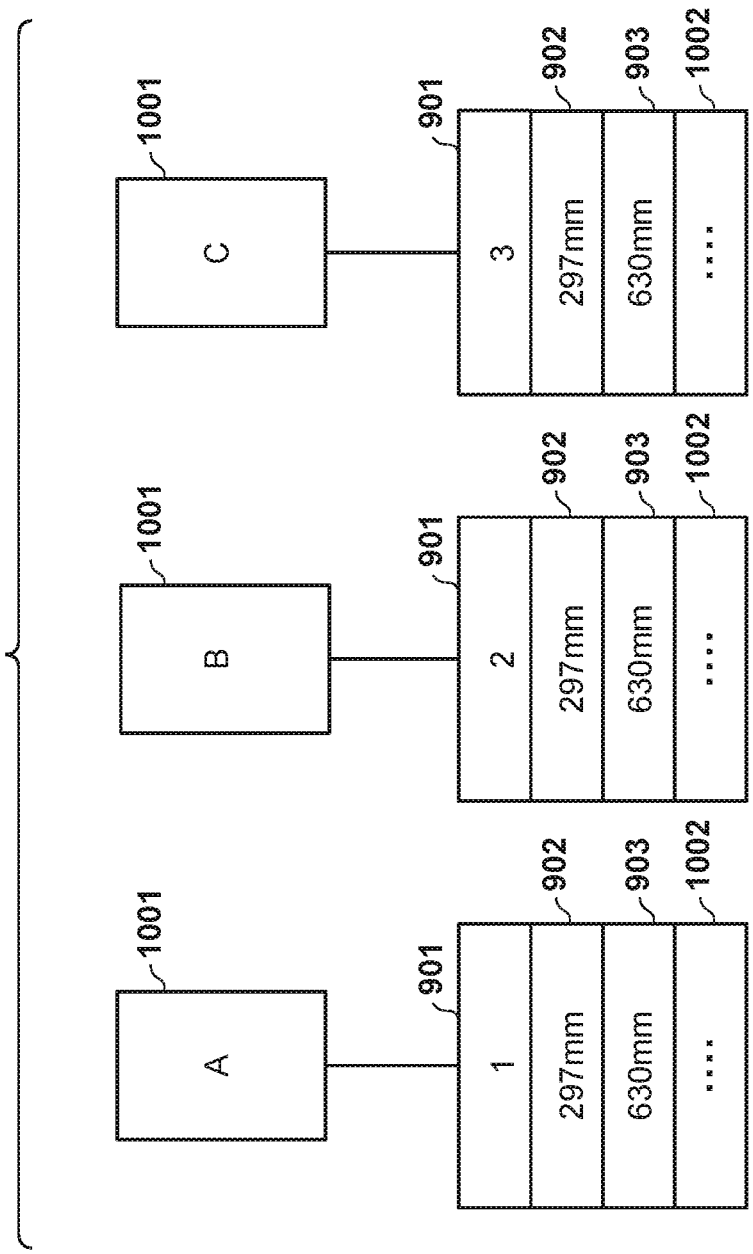
FIG. 10 is a diagram for describing a structure of image data stored in the storage memory as a result of three sheets of originals being read by a reading unit in the MFP according to the first embodiment.

FIG. 10 is a diagram for describing a configuration of image data stored in the storage unit 105 as a result of three sheets of originals being read by the reading unit 112 in the MFP according to the first embodiment. The portions that are the same as those of FIG. 9 are given the same reference numerals.

Reference numeral 1001 indicates image data of three sheets of originals, and attribute data 1002 is associated with the image data of each sheet in one to one correspondence. For example, in the attribute information of the image data 1001 of original A, the following information is stored: the image ID being "1", the image size X 902 being "297 mm," and the image size Y 903 being "630 mm". The attribute information of the image data 1001 of originals B and C is the same as those of the image data 1001 of original A.

Next, print processing of printing the image data stored in the storage unit 105 in the above-described manner will be described with reference to FIGS. 11 to 15.

Figure 11:
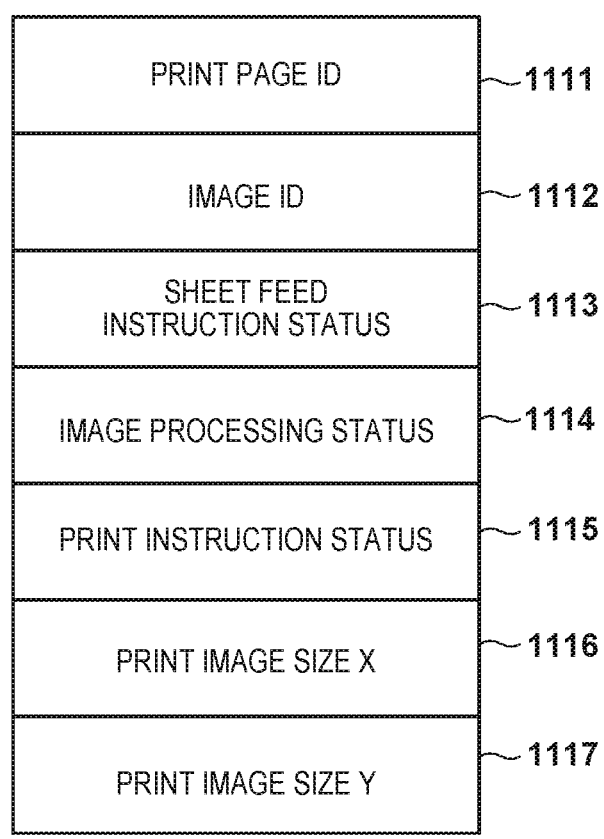
FIG. 11 is a diagram for describing one piece of print managing data generated for one page of original data to be printed in the MFP according to the first embodiment.

FIG. 11 is a diagram for describing one piece of print managing data generated for one page of original data to be printed in the MFP according to the first embodiment.

Print page ID 1111 is identification information for identifying a print page used when a control command is issued to the engine controller 116. As image ID 1112, the same one as the image ID 901 assigned at the time of reading is set. Sheet feed instruction status 1113, image processing status 1114, and print instruction status 1115 are for managing the state of issuance of a sheet feed instruction, an image processing instruction, and a print instruction, respectively, as well as managing the sequence. In these statuses, results obtained as a result of control commands, such as a sheet feed instruction, a sheet feeding end notification, a print start instruction, and a sheet discharge notification being exchanged between the engine controller 116 and the control unit 115 are reflected. In print image size X 1116 and print image size Y 1117, the image size information exchanged together with the control commands is reflected.

Figure 12:
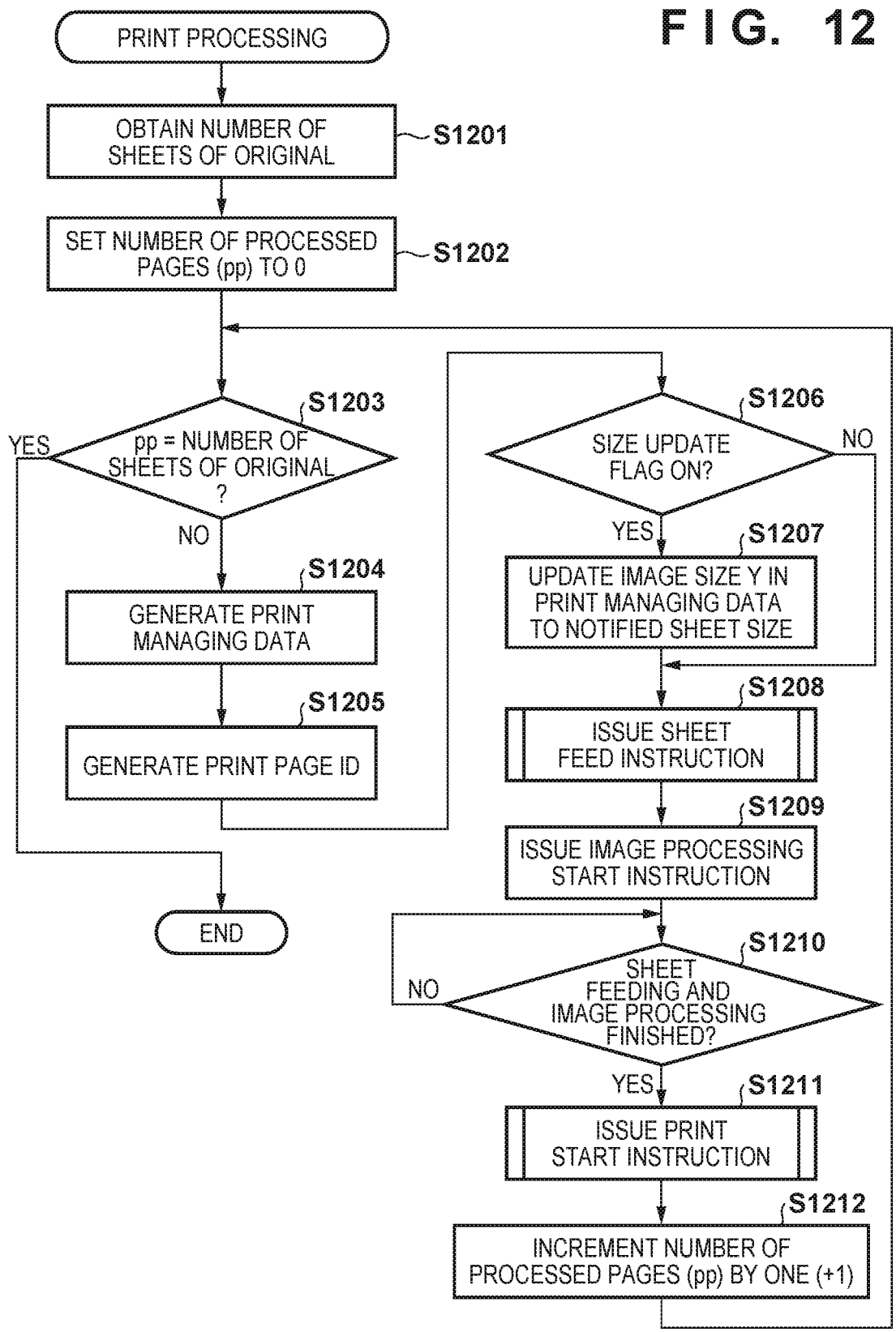
FIG. 12 is a flowchart for describing print processing in the MFP according to the first embodiment.

FIG. 12 is a flowchart for describing print processing in the MFP according to the first embodiment. The processing shown in the flowchart is achieved by the CPU 103 executing a program deployed from the storage unit 105 into the RAM 104. This processing starts in response to an original being read by the reading unit 112, image data being stored in the storage unit 105 as shown in FIG. 10, and a print instruction to print the image data being provided.

First, in step S1201, the CPU 103 obtains the number of sheets of the original to be printed stored in the storage unit 105. The number of sheets of the original is determined during reading processing of the original and stored in the RAM 104, and thus, the CPU 103 obtains the stored number of sheets of the original. Next, the procedure proceeds to step S1202, where the CPU 103 sets a variable pp for storing information regarding the number of processed pages in the RAM 104, and initializes the variable pp to "0". Through the above processing, initialization of the number of printed pages ends. Next, the procedure proceeds to step S1203, where the CPU 103 makes a comparison between the variable pp (the number of processed pages) and the number of sheets of the original obtained in step S1201, and determines whether or not they match with each other, or, in other words, whether all of the pages have been printed. If it is determined in step S1203 that all of the pages have been printed, the processing ends.

If, on the other hand, the CPU 103 determines in step S1203 that all of the pages have not been printed, the procedure proceeds to step S1204, where, for example, print managing data as shown in FIG. 11 is generated by referencing to the attribute information 1002 shown in FIG. 10. The print managing data is created by the print processing module 302 performing matching processing using the image ID 901 notified with the print execution instruction 310 issued by the job control module 301 and then copying necessary information. The main information copied at this time includes the image ID 901, the image size X 902, and the image size Y 903 that are stored as the attribute information 1002, and the image size X 902, and the image size Y 903 are respectively copied to the print image size X 1116 and the print image size Y 1117. Next, the procedure proceeds to step S1205, where the CPU 103 generates a print page ID for use in exchanging control commands with the engine controller 116. Here, the print page ID 1111 and the image ID 901 are not necessarily the same. For example, in the case of copying image data a single sheet of an original onto a plurality of sheets (multiple copies), a plurality of print page IDs are assigned to one image ID 901. In the first embodiment, an operation will be described with settings in which a comparison can be made in one to one correspondence, but it is not intended to limit the scope of the invention to image forming in which the comparison can be made in one to one correspondence.

After the print page ID 1111 has been generated by the CPU 103 as described above in step S1205, the procedure proceeds to step S1206, where it is determined whether or not a size update flag is on. The size update flag is a variable saved in the RAM 104 and updated in response to reception of a sheet size notification, which is one of the control commands. An operation performed when a sheet size notification is received will be described later with reference to the flowchart shown in FIG. 15. If the CPU 103 determines in step S1206 that the sheet size update flag is not on, the procedure proceeds to step S1208 without sheet size update processing of step S1207 being performed, and the CPU 103 issues a sheet feed instruction. If the CPU 103 determines in step S1206 that the sheet size update flag is on, the procedure proceeds to step S1207, where the CPU 103 updates the print image size Y 1117 of the generated print managing data to the sheet size received with the sheet size notification, and the procedure proceeds to step S1208. The notified sheet size information is obtained by reading the sheet size stored in the RAM 104 in print start instruction issuing processing shown in FIG. 15, which will be described later, and is used to update the print image size Y 1117.

In step S1208, the CPU 103 issues a sheet feed instruction 312 to the engine controller 116 based on the print managing data generated in steps S1204 to S1207. Then, the procedure proceeds to step S1209, where the CPU 103 provides, to the image processing unit 111, an image processing start instruction 311 for image processing for printing. The image processing for printing includes a processing operation of setting image size information regarding the size of the image to be printed based on the print image size X/Y included in the print managing data and changing the image size, and the like. After a notification of the start of image processing for printing has been provided in the manner described above, in step S1210, the CPU 103 determines whether or not the image processing and the sheet feed operation have been completed. Here, the determination is made based on whether the fields for the sheet feed instruction status 1113 and the image processing status 1114 in the print managing data respectively indicate "sheet feed processing completed" and "image processing completed". When the sheet feed processing and the image processing end, the procedure proceeds to step S1211, where the CPU 103 issues a print start instruction 315 to the engine controller 116. Then, when one page has been printed, the procedure proceeds to step S1212, where the value of the variable pp indicating the number of printed pages stored in the RAM 104 is incremented by one (+1), and then the procedure proceeds to step S1203.

Figure 13:
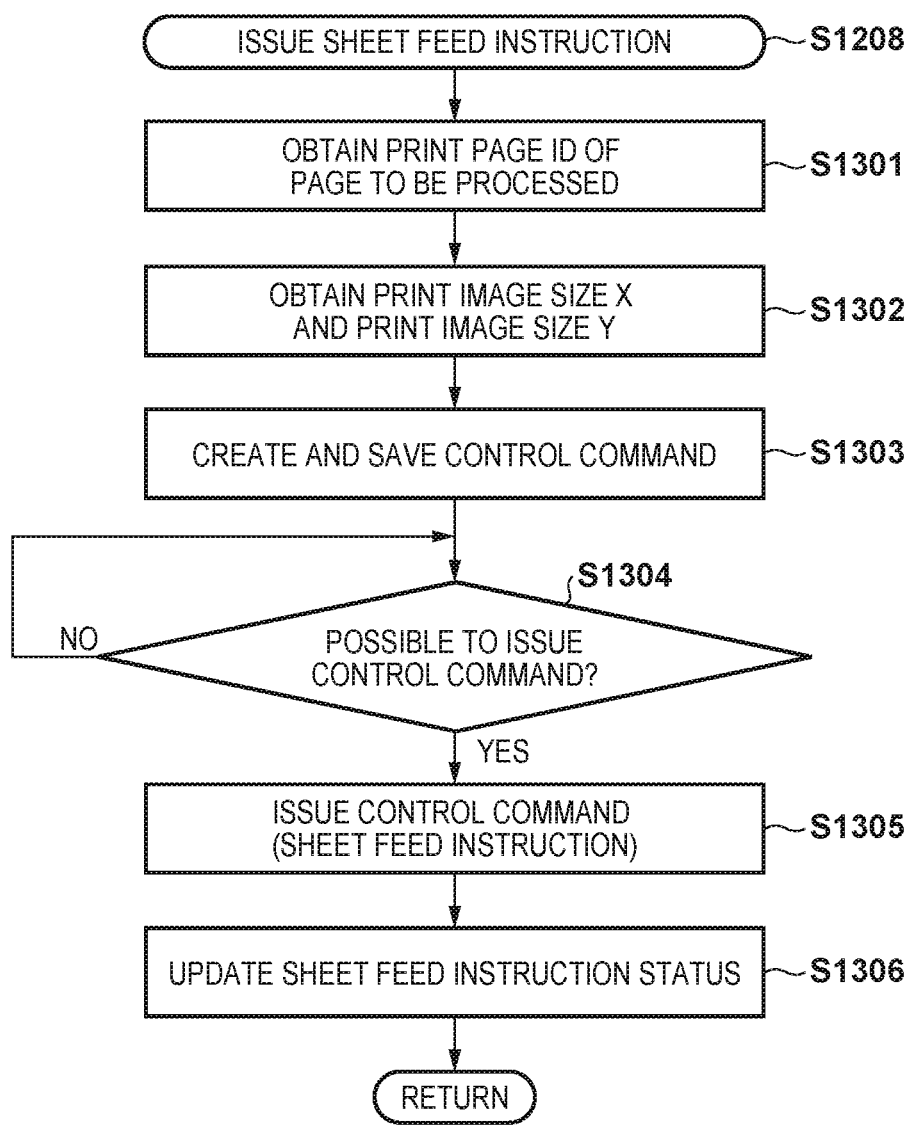
FIG. 13 is a flowchart for describing sheet feed instruction issuing processing performed in step S1208 shown in FIG. 12.

FIG. 13 is a flowchart for describing sheet feed instruction issuing processing performed in step S1208 shown in FIG. 12.

First, in step S1301, the CPU 103 obtains the print page ID 1111 of the page to be printed from the print managing data. Next, the procedure proceeds to step S1302, where the CPU 103 obtains the print image size X 1116 and the print image size Y 1117 from the print managing data. Then, the procedure proceeds to step S1303, where the CPU 103 creates data of a control command for a sheet feed instruction 312 to be transmitted to the engine controller 116 and stores the created data in the RAM 104. At the time of step S1303, the control command is simply stored in the RAM 104 and thus, is not issued to the engine controller 116. Next, the procedure proceeds to step S1304, where the CPU 103 determines whether or not the control command can be issued to the engine controller 116. Here, the determination that the control command can be issued is made based on a condition that the page in process is the first page for which print managing data has not been generated at this time, or with respect to another piece of print managing data, whether the sheet feed instruction 312 has been issued for the print page ID of the previous page. Here, if it is determined that the control command can be issued, the procedure proceeds to step S1305, where the sheet feed instruction 312 is issued to the engine controller 116. Then, the procedure proceeds to step S1306, where the CPU 103 changes the sheet feed instruction status 1113 in the print managing data to "sheet feed instruction issued". Then, the processing ends.

After the sheet feed instruction 312 has been issued to the engine controller 116 as described above, in step S1209 shown in FIG. 12, the CPU 103 notifies the image processing unit 111 of the start of the image processing for printing. At this time, the image processing unit 111 determines image size regarding the size of the image to be printed based on the print image size X/Y included in the print managing data and performs processing on the image data to be printed.

Figure 14:
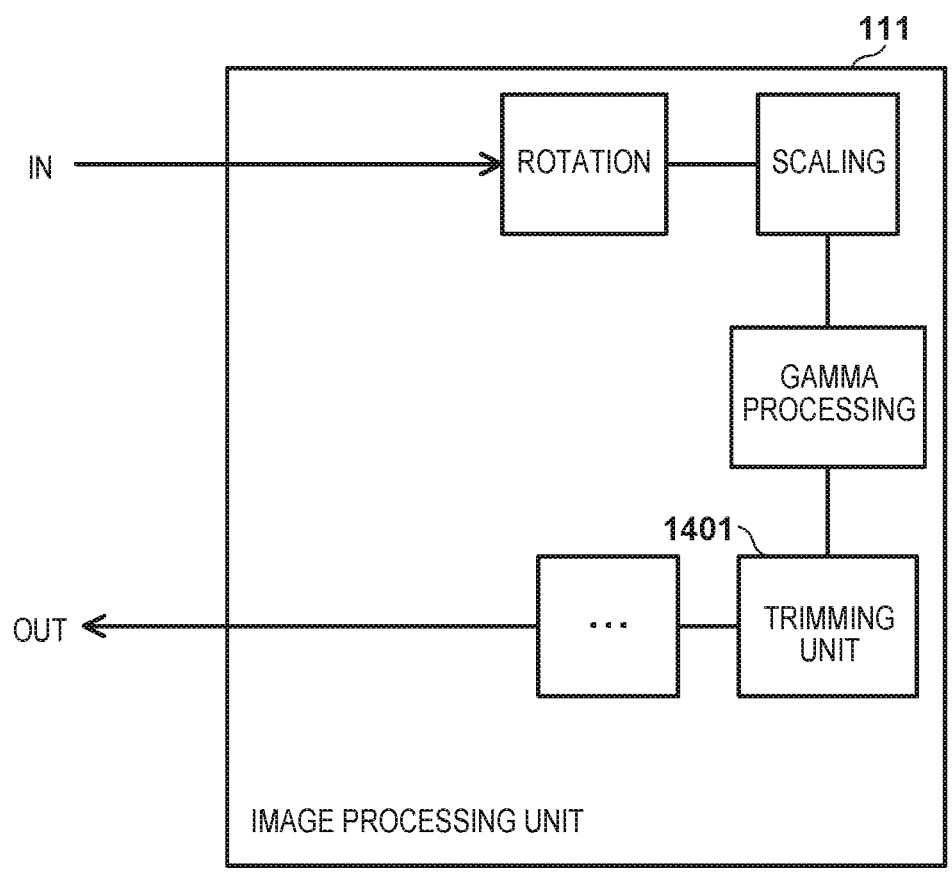
FIG. 14 is a functional block diagram illustrating functions of an image processing unit according to the first embodiment.

FIG. 14 is a functional block diagram for describing functions of the image processing unit 111 according to the first embodiment.

The image processing unit 111 performs necessary processing operations, such as rotation and scaling on the image data input from the reading unit 112, and, after that, a trimming unit 1401 trims the image size to a size corresponding to the print image size X/Y information.

Next, the processing of issuing a print start instruction 315 performed in step S1211 shown in FIG. 12 will be described with reference to FIG. 15.

Figure 15:
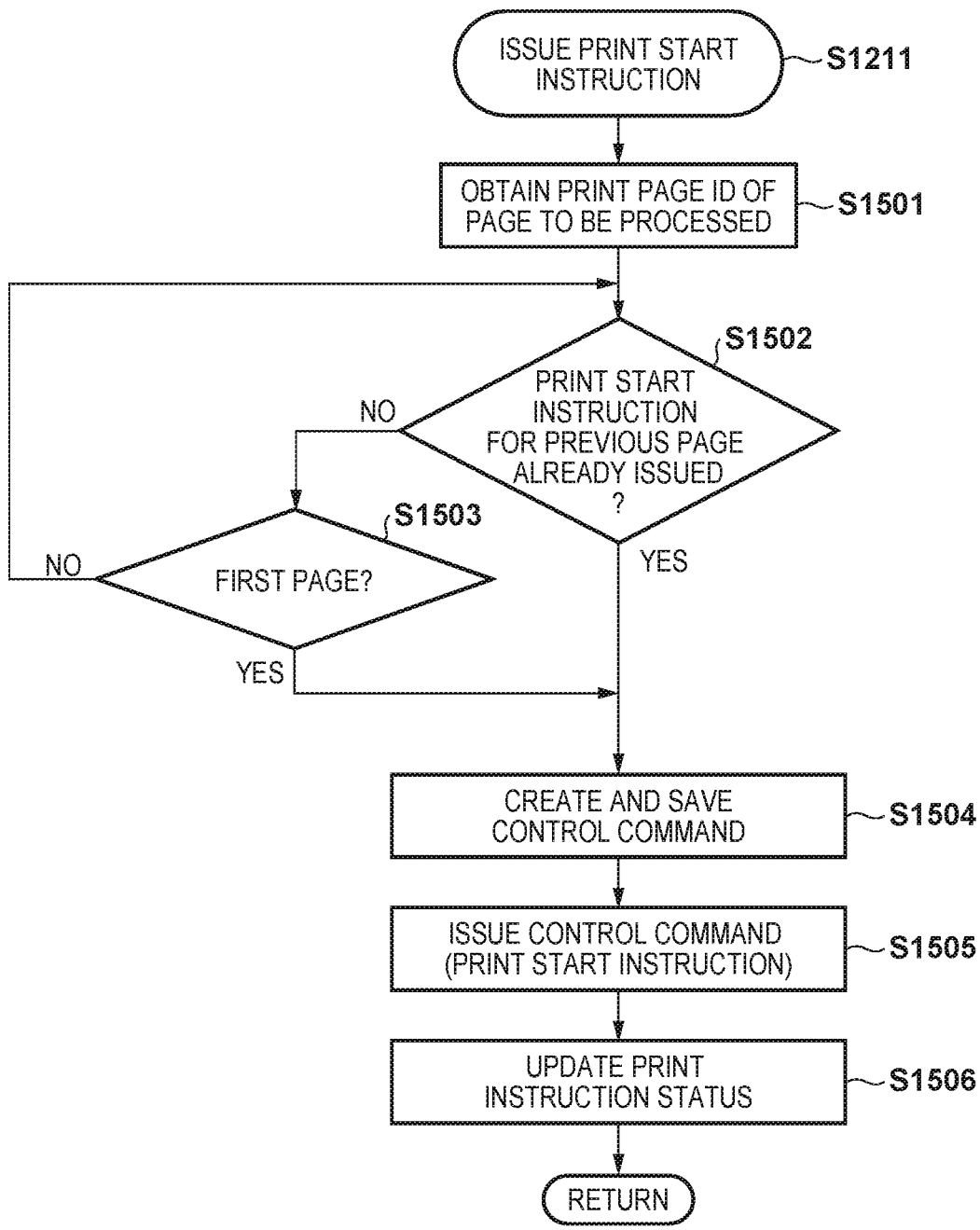
FIG. 15 is a flowchart for describing processing of issuing a print start instruction from a control unit to the engine controller, which is performed in step S1211 shown in FIG. 12.

FIG. 15 is a flowchart for describing processing of issuing a print start instruction from the control unit 115 to the engine controller 116, which is performed in step S1211 shown in FIG. 12.

First, in step S1501, the CPU 103 obtains the print page ID 1111 of a page to be processed. Next, the procedure proceeds to step S1502, where the CPU 103 references to print managing data for the print page ID obtained in step S1501 and determines whether or not there is an unissued print start instruction for the previous print page ID that is prior to the print page ID of the page to be processed. Here, if an unissued print start instruction for the previous print page ID is not found, the procedure proceeds to step S1504. Otherwise, the procedure proceeds to step S1503. In step S1503, the CPU 103 determines whether or not the page to be processed is the first page, or, in other words, whether there is information regarding the previous page. If it is determined that the page to be processed is not the first page, the procedure proceeds to step S1502. If it is determined, however, that the page to be processed is the first page, the procedure proceeds to step S1504. In step S1504, the CPU 103 creates a control command to be transmitted to the engine controller 116 and saves the created control command in the RAM 104, and "3" (print start instruction) is set in the control ID of the control command. Also, the print image size X and the print image size Y are copied from the print managing data to the sheet size (X) and the sheet size (Y), respectively. Then, the procedure proceeds to step S1505, where the CPU 103 transmits the created control command (print start instruction) to the engine controller 116. Then, the procedure proceeds to step S1506, where the CPU 103 changes the print instruction status to "print instruction issued". Then, the processing ends.

After that, the procedure proceeds to step S1212 in the flowchart shown in FIG. 12, and the counter for counting the number of printed pages is incremented by one (+1), and then the procedure proceeds to step S1203. In this way, the processing of printing image data to be printed can be carried out.

Also, the engine controller 116 that has received the print start instruction outputs a synchronization signal for image data. The control unit 115 that has received the synchronization signal changes the print instruction status in the print managing data to "synchronization signal received". Here, in the case of printing a plurality of pages, as described above, control is performed to issue control commands, such as a sheet feed instruction, a print start instruction, a sheet feeding end notification, and a sheet discharge notification for the plurality of pages. Accordingly, the control unit 115 and the engine controller 116 perform an operation according to the sequence shown in FIGS. 16A and 16B.

Figure 16A:
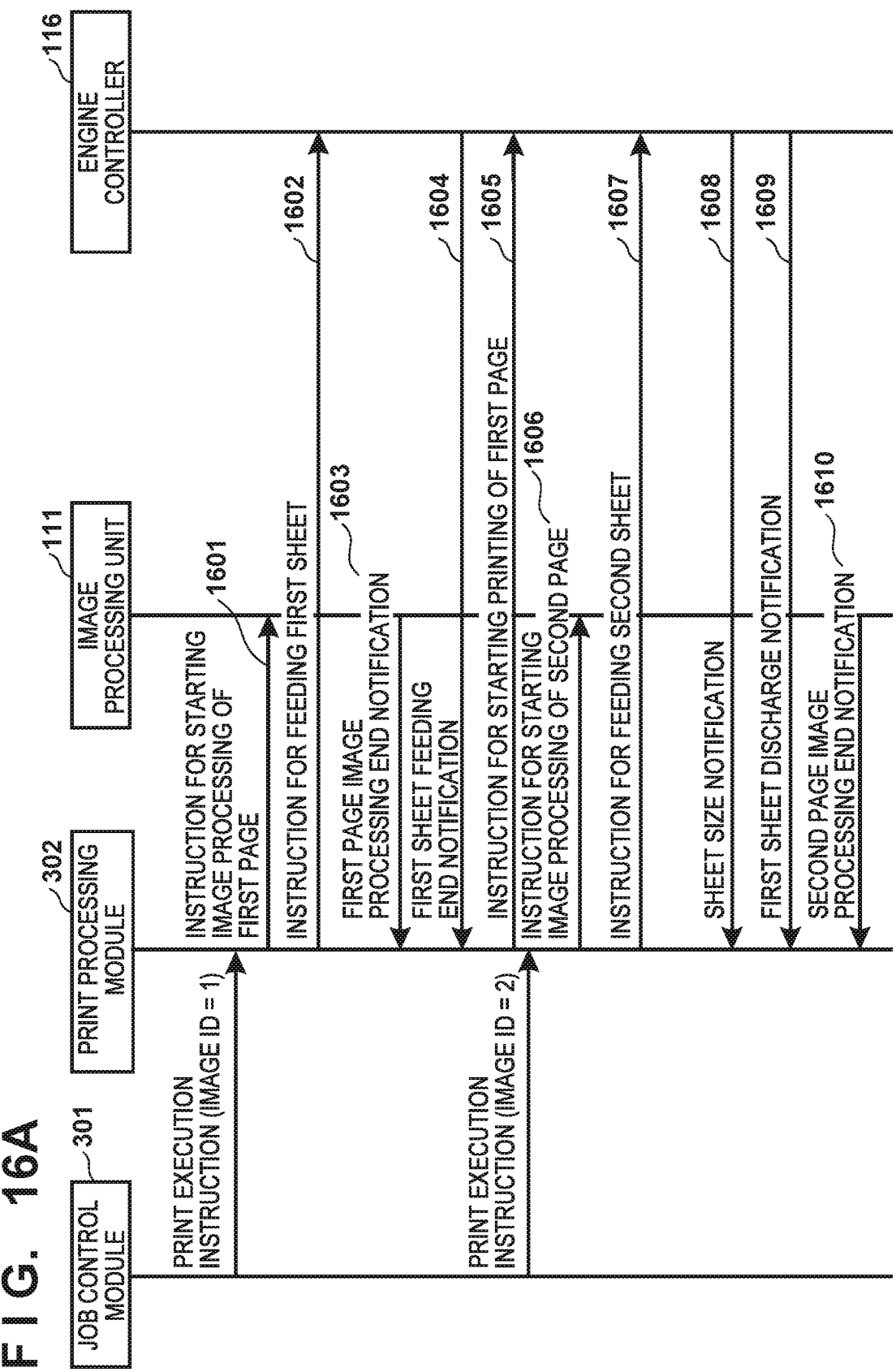
FIGS. 16A and 16B are diagrams for describing a sequence of exchanging control commands between the engine controller and the functional units implemented by a program of the MFP according to the first embodiment.
Figure 16B:
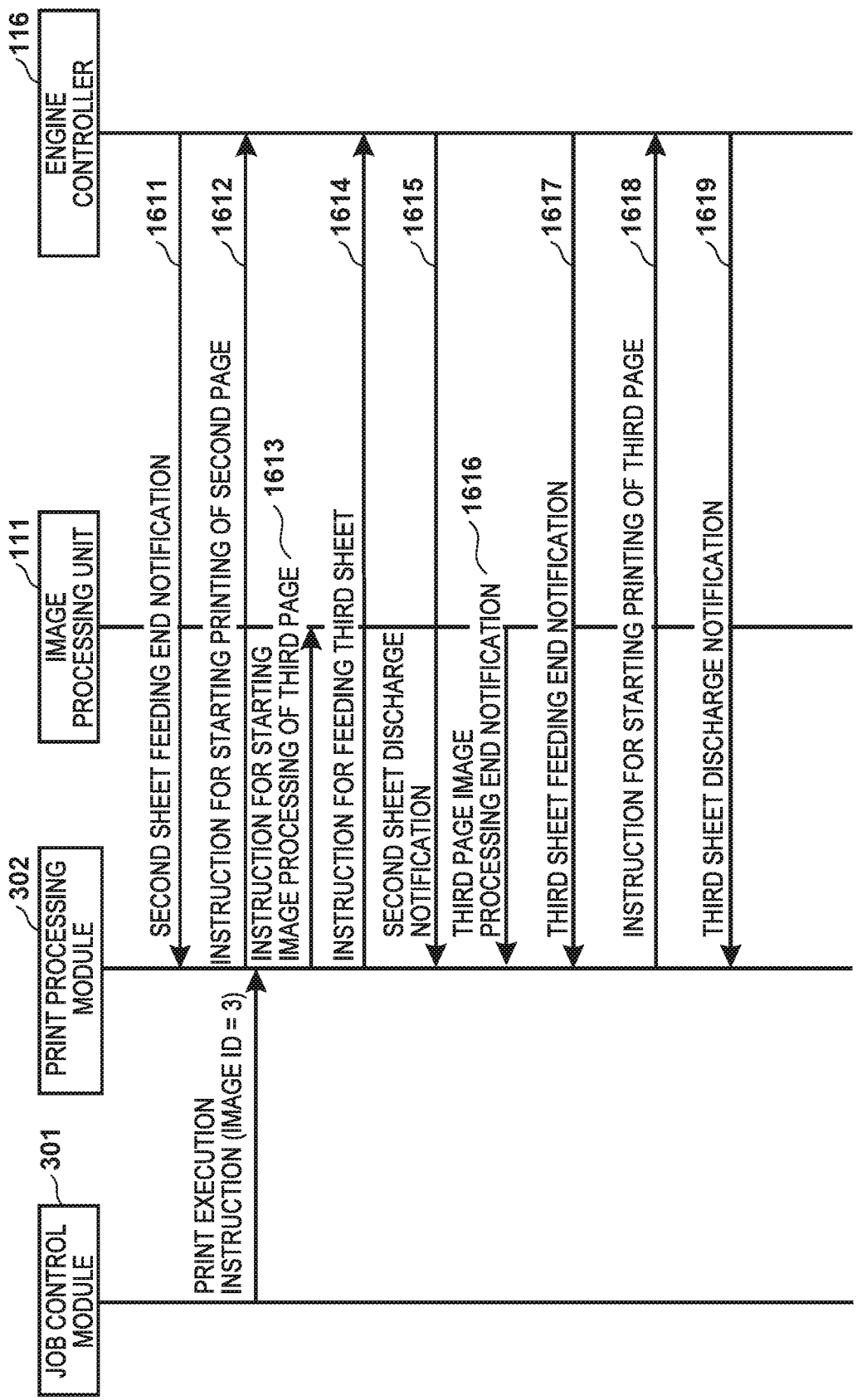

FIGS. 16A and 16B are diagrams for describing a sequence of exchanging control commands between the engine controller 116 and the functional units implemented by the program of the MFP according to the first embodiment. The processing units and the control units that are the same as those of FIG. 3 described above are given the same reference numerals. Here, an example is shown in which image data of three sheets of originals are printed on three sheets of paper.

If the user of the MFP provides an instruction to perform copy processing with the sheet size being set to free size, the reading unit 112 reads an original, and, thereafter, the job control module 301 issues a print execution instruction for executing printing of the image data of the first page (image ID=1) to the print processing module 302. The print execution instruction includes an image ID (=1) associated with the original as the identifier. The print processing module 302 that has received the print execution instruction issues an instruction 1601 for starting image processing of the image data of the first page to the image processing unit 111, and also issues, to the engine controller 116, an instruction 1602 for feeding the first sheet on which the image data of the first page is to be printed. In response thereto, the image processing unit 111 performs image processing, such as gamma processing and half-toning, on the image data of the first page, and, upon completion of the image processing, issues a first page image processing end notification 1603 to the print processing module 302. Also, upon receiving the instruction 1602 for feeding the first sheet, the engine controller 116 starts a sheet feed operation, and, upon completion of the sheet feed operation, issues a first sheet feeding end notification 1604 to the print processing module 302.

The image data of the first page is prepared in the manner described above, and, upon completion of feeding of the first sheet of paper, the print processing module 302 issues an instruction 1605 for starting printing of the image data of the first page to the engine controller 116. In response thereto, the engine controller 116 transmits a synchronization signal for image data to the control unit 115. The control unit 115 that has received the synchronization signal outputs the image data to the printer unit 113 in synchronization with the synchronization signal. The engine controller 116 that has received the image data prints an image on the first sheet according to the image data of the first page. When the printed sheet is discharged after printing, the engine controller 116 issues a first sheet discharge notification 1609 to the print processing module 302.

At the time of printing the first page, an instruction for executing printing of the second page is issued from the job control module 301 to the print processing module 302. In response thereto, the print processing module 302 issues an instruction 1606 for starting image processing of the image data of the second page to the image processing unit 111, and the print processing module 302 also issues, to the engine controller 116, an instruction 1607 for feeding the second sheet on which the image data of the second page is to be printed. Then, the engine controller 116 issues the result of detection of the size of the first sheet on which the first page has been printed to the print processing module 302 as a sheet size notification 1608.

The image processing unit 111 performs image processing on the image data of the second page, and, upon completion of the image processing, issues a second page image processing end notification 1610 to the print processing module 302. Also, upon receiving the instruction 1607 for feeding the second sheet during printing of the first page, the engine controller 116 starts a second sheet feed operation, and, upon completion of the sheet feed operation of the second sheet, issues a second sheet feeding end notification 1611 to the print processing module 302. After that, the image data of the second and third pages are respectively printed onto the second and third sheets in processing indicated by 1612 through 1619.

Figure 17:
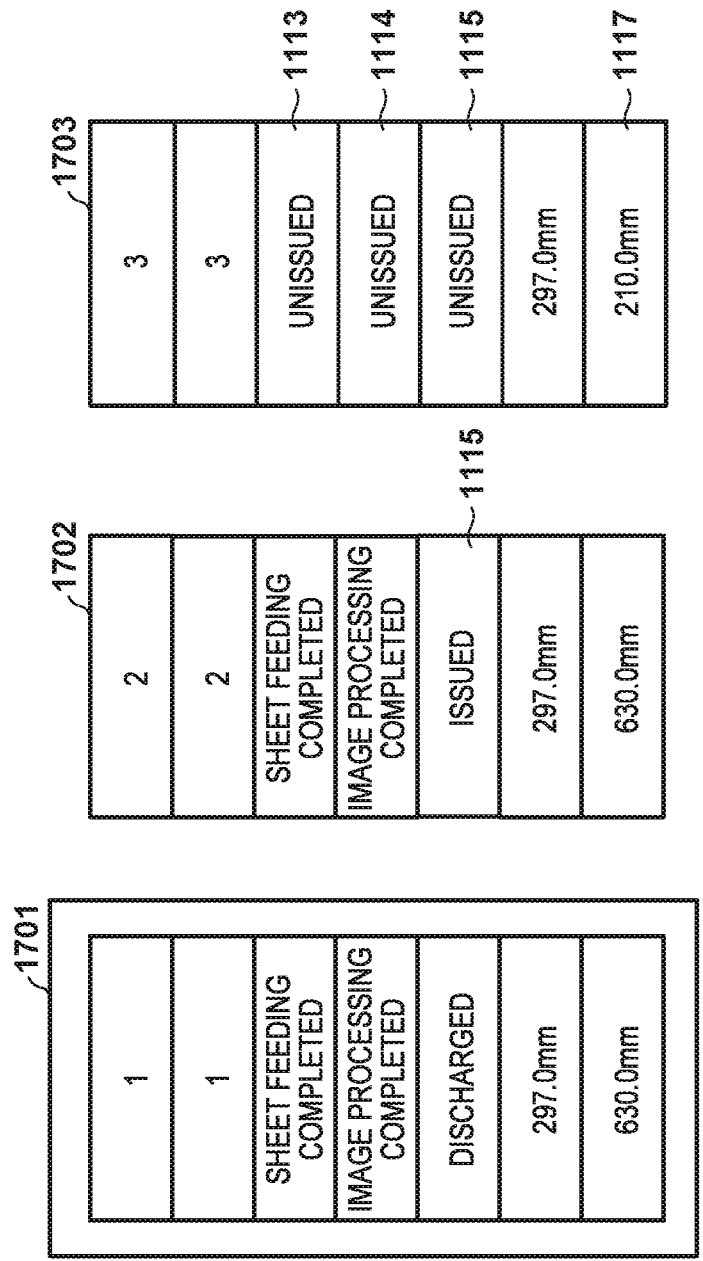
FIG. 17 shows an example of print managing data at the time when the print processing module issues a print start instruction to start printing the second page to the engine controller in FIGS. 16A and 16B.

FIG. 17 is a diagram showing an example of print managing data at the time when the print processing module 302 issues the instruction 1612 for starting printing of the second page to the engine controller 116 in FIGS. 16A and 16B.

At this time, printing of the image data of the first page has been completed, and an instruction to start printing the image data of the second page has been issued. Thus, print managing data 1701 for the first page may be deleted because it has already been used. Also, in print managing data 1702 for the second page, the print instruction status 1115 indicates "issued". This indicates that an instruction for starting printing of the image data of the second page has been issued, but printing of the image data of the second page has not been completed. Likewise, in print managing data 1703 for the third page, the sheet feed instruction status 1113, the image processing status 1114, and the print instruction status 1115 all indicate "unissued". Note that, after issuance of the instruction 1607 for feeding the second sheet, the size of the sheet on which the first page has been printed, or, in other words, the sheet size ("sheet size (Y)=210.0 mm") is notified from the engine controller 116 as the sheet size notification 1608. For this reason, in the print managing data 1703 for the third page, "210.0 mm", which is the size of the first sheet notified with the sheet size notification 1608, is stored in the print image size Y 1117.

Figure 18:
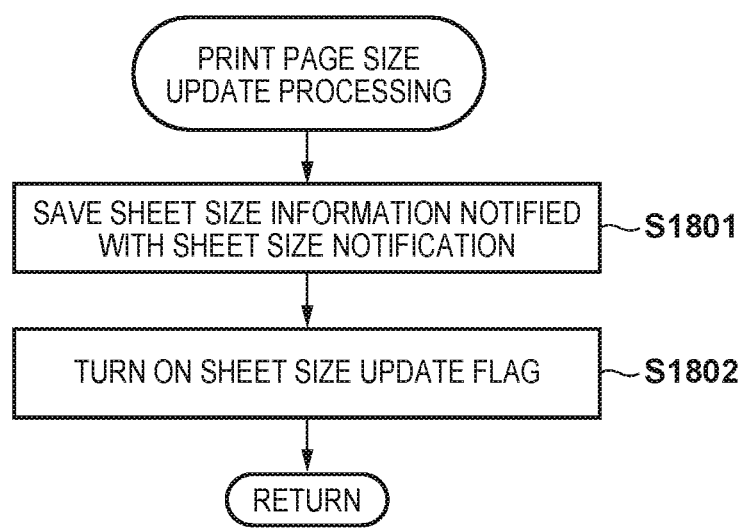
FIG. 18 is a flowchart for describing print page size update processing performed in the MFP according to the first embodiment.

A supplementary description of the creation of the print managing data will now be given. Immediately after generation of the print managing data, the size of the original in the image attribute information set in the image data created at the time of reading the original is set as print image size X/Y information, and each status indicates "unissued". Then, at the time of the instruction 1602 for feeding the first sheet shown in FIGS. 16A and 16B, for example, in the print managing data 1701 for the first page, the sheet feed instruction status 1113 is changed to "sheet feed instruction issued", and the image processing status 1114 is changed to "image processing completed". Then, at the time of the instruction 1605 for starting printing of the first page shown in FIGS. 16A and 16B, the feeding of a sheet on which the image data of the first page is to be printed and the image processing of the image data of the first page have been finished, and the instruction 1605 for starting printing of the first page has been issued. Accordingly, in the print managing data 1701 for the first page at this time, the sheet feed instruction status 1113 is changed to "sheet feeding completed", the image processing status 1114 is changed to "image processing completed", and the print instruction status 1115 is changed to "print instruction issued". After that, in the same manner as described above, the print managing data is updated, and, upon receiving the sheet size notification 1608, the processing of the flowchart shown in FIG. 18 is executed. At the time of printing the third page, because the sheet size update flag is on in step S1206 shown in FIG. 12, the notified size (here, "210.0 mm") is stored in the print image size Y 1117 of the print managing data 1703 for the third page in step S1207 shown in FIG. 12.

Next, the processing performed when the control unit 115 receives a sheet size notification 1608 from the engine controller 116 will be described with reference to the flowchart shown in FIG. 18.

FIG. 18 is a flowchart for describing print page size update processing performed in the MFP according to the first embodiment. The processing shown in the flowchart is achieved by the CPU 103 executing a program deployed from the storage unit 105 into the RAM 104.

It is assumed here that, for example, a sheet size (Y) of "210.0 mm" is notified with the sheet size notification 1608 shown in FIGS. 16A and 16B.

First, in step S1801, the CPU 103 sets "210.0 mm" in the sheet size variable saved in the RAM 104. Next, the procedure proceeds to step S1802, where the CPU 103 turns on the sheet size update flag of the RAM 104, and the processing ends.

Through the above processing, in response to an instruction 1613 for starting image processing of the third page shown in FIGS. 16A and 16B, the processing of steps S1204 and S1205 shown in FIG. 12 is carried out on the image data of the third page. Furthermore, because the sheet size update flag is on, the procedure proceeds to step S1207, where the print image size Y 1117 in the print managing data of the third page is changed to "210.0 mm". Accordingly, as shown in FIG. 17, in the print managing data 1703 for the third page, the print image size Y 1117 is changed to "210.0 mm", and the sheet feed operation and the image processing for the third page are executed according to the updated print image size Y "210.0 mm".

Through the above processing, it is unnecessary to perform processing on the image data of the third page by using "630 mm," which is the printable maximum size used for the image data of the first and second pages, and image data having a size about one third of that of the image data of the first and second pages is processed. This can reduce the image data processing time. Also, it is thereby possible to shorten the time required to print one page and to improve print performance. The print managing data for the page for which the sheet discharge notification has been received, for example, the print managing data 1701 for the first page shown in FIG. 17, is deleted as appropriate.

FIGS. 19A and 19B are timing charts for a comparison between print control according to the first embodiment and print control according to a conventional technique. FIG. 19A is a timing chart showing print control according to a conventional technique, and FIG. 19B is a timing chart showing print control according to the first embodiment. In the diagrams, the attached numbers 1 to 3 indicate page numbers to be printed.

In FIG. 19A, sheet feeding 1902 and image processing 1903 for the image data of the second page are started by waiting for reception of the size information regarding the size of the sheet on which the image data of the first page has been printed. Accordingly, the sheet feeding 1902 for feeding a sheet on which the second page is to be printed and the image processing 1903 on the image data of the second page are started after the image data of the first page has been printed. For this reason, printing 1901 of the image data of the second page is started late.

In contrast, in the case of the print control according to the first embodiment shown in FIG. 19B, the processing for printing the image data of the second page is started without waiting for reception of the size information of the sheet on which the image data of the first page has been printed. For this reason, the instruction 1607 for feeding the second sheet on which the image data of the second page is to be printed (FIGS. 16A and 16B) is issued antecedently without waiting for printing of the image data of the first page. Accordingly, sheet feeding 1905 for feeding a sheet on which the image data of the second page is to be printed and image processing 1906 on the image data of the second page are started at the same time when sheet feeding for feeding a sheet for the first page is finished. In the manner described above, sheet feeding for feeding a sheet for the second page and image processing for the second page can be carried out antecedently. It is, therefore, possible to advance the start time for printing 1904 of the second page.

In addition, at the time of printing the image data of the third page, image processing and print processing are executed according to the size of the preceding sheet that was notified with the sheet size notification 1608. For this reason, the time required to perform sheet feeding of a sheet for the third page and processing of the image data of the third page is reduced as compared to when image processing and print processing are performed according to the maximum size used for the first and second pages. The same performance as that of the conventional technique is provided when printing the image data of the third and subsequent pages.

As described above, it is possible to implement the same performance as that of the conventional technique after printing of the image data of the third page while reducing the time required to start the printing of the image data of the second page.

In the sequence shown in FIGS. 16A and 16B as an example, a sheet size notification is issued between the second sheet feed instruction for the second page and the third sheet feed instruction for the third page, but the timing of issuance of the sheet size notification is not limited thereto. For example, if the time required for sheet feeding and image processing is shortened, the sheet size notification may be issued at a timing after the sheet feeding and the image processing. Also, depending on the configuration of the printer unit 113, the sheet size notification 1608 may be issued between the sheet feeding for the first page and the sheet feeding for the second page.

As described above, according to the first embodiment, it is possible to advance the start time for printing the image data of the second page irrespective of the timing of the sheet size notification. Also, in the printing of the image data of the subsequent pages after the sheet size notification, the notified sheet size can be reflected as appropriate in the image processing and the print processing, as a result of which, it is possible to more effectively perform printing.

Second Embodiment

Figure 20:
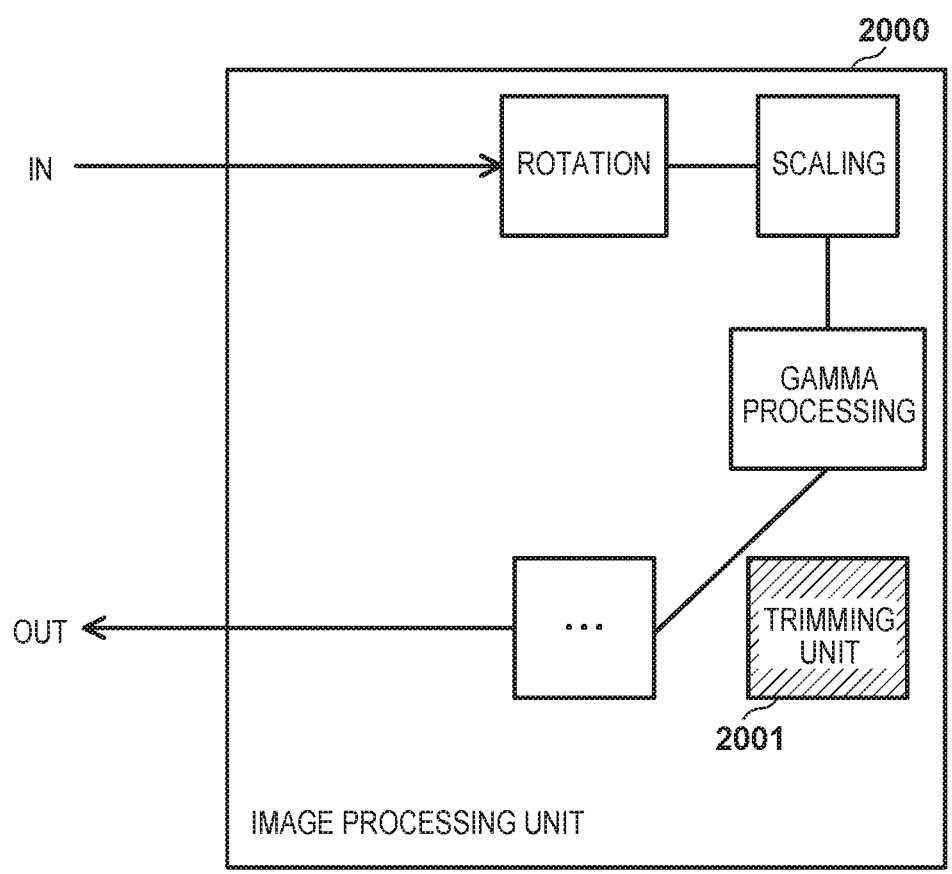
FIG. 20 is a functional block diagram for describing functions of an image processing unit according to a second embodiment.

The first embodiment described above is configured such that, with respect to the subsequent pages after the sheet size notification, only a necessary portion of the image data is processed by the trimming unit 1401 of the image processing unit 111 so as to speed up image processing. There may be a case, however, in which, for example, as shown in FIG. 20, a trimming unit 2001 cannot be used for print processing or in which the image processing unit does not include a trimming unit. In this case, it is not possible to speed up image processing in the manner described above. Accordingly, as a second embodiment, an example will be described in which free size printing is executed by a different method. An MFP according to the second embodiment has the same configuration as that of the MFP according to the first embodiment described above, except that an image processing unit 2000 is provided, and thus, a description thereof is omitted here.

FIG. 20 is a block diagram for describing a functional configuration of the image processing unit 2000 according to the second embodiment.

In the image processing unit 2000 shown in FIG. 20, the trimming unit 2001 cannot be used for print processing.

In the MFP according to the second embodiment, irrespective of the size of the sheet on which printing is to be performed, in the free size print mode, image data of a maximum readable image size is output until the sheet size is confirmed, and the print operation is controlled by a sheet discharge notification issued by the engine controller 116. In the image data processing, image data of maximum size of the read image is generated. Accordingly, in order to perform processing according to the size of the sheet, it is necessary to perform trimming for removing an unoutput portion of the image data extending beyond the sheet size. In a case in which the image processing unit 2000 cannot use the trimming unit 2001 to remove the unoutput portion of the image data, however, even if a sheet size notification is notified from the engine controller 116, the unoutput portion of the image data cannot be removed so as to cause the image data to fit into the notified sheet size. Accordingly, in this case, it is necessary to prevent the notified sheet size from being reflected in the image processing and the sheet feed instruction.

Figure 21:
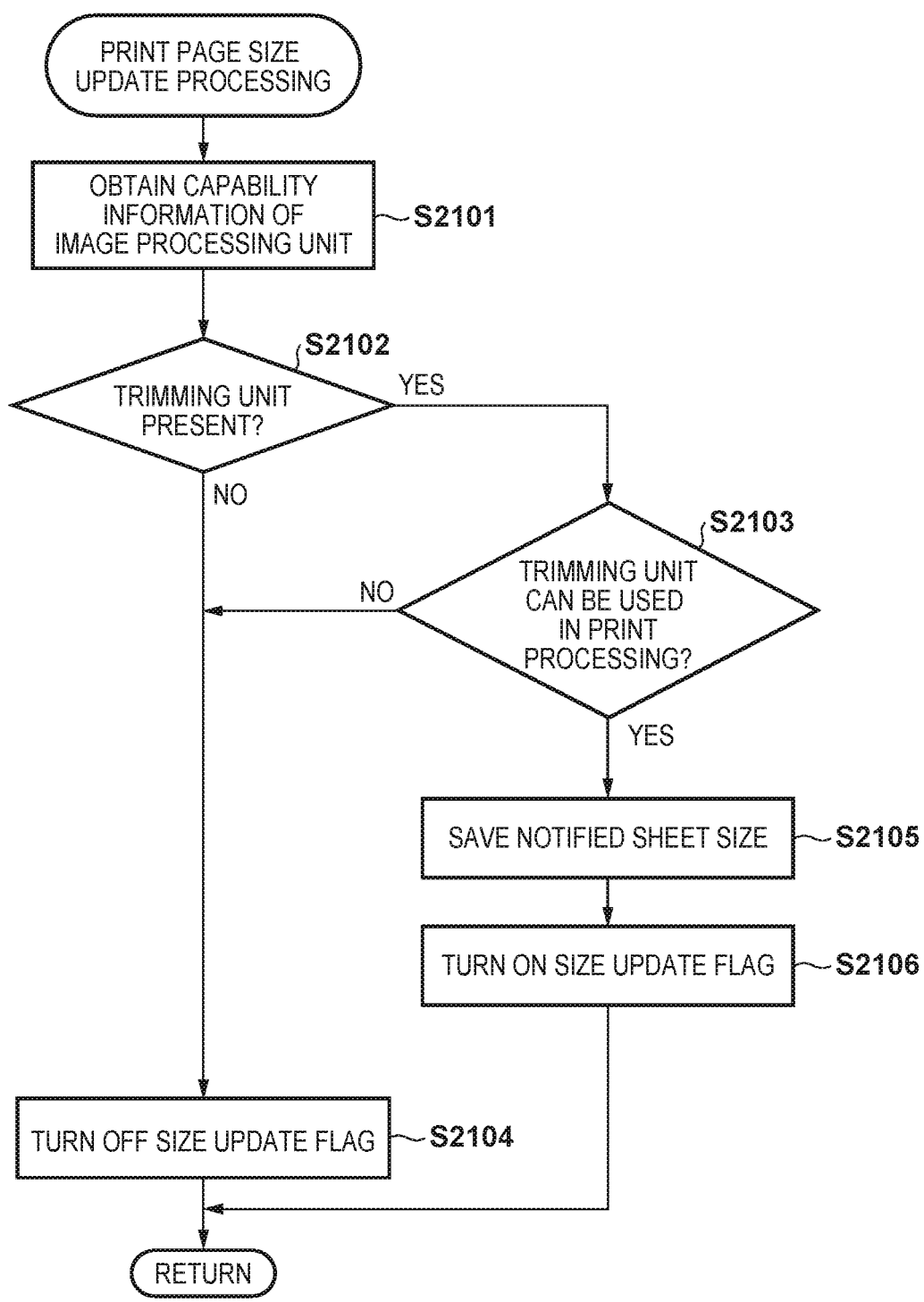
FIG. 21 is a flowchart for describing print page size update processing performed in the MFP according to the second embodiment.

FIG. 21 is a flowchart for describing print page size update processing performed in the MFP according to the second embodiment. The processing shown in the flowchart is achieved by the CPU 103 executing a program deployed from the storage unit 105 into the RAM 104.

First, in step S2101, the CPU 103 obtains capability information of the image processing unit 2000. In order to obtain the capability information, for example, an area for indicating the capability information may be provided in the ROM 102, and the CPU 103 may obtain the capability information of the image processing unit 2000 from the ROM 102. It is also possible to dynamically recognize the type of ASIC constituting the image processing unit 2000 and to use the recognized type of ASIC as the capability information. Next, the procedure proceeds to step S2102, where the CPU 103 determines whether or not the image processing unit 2000 includes the trimming unit 2001 that can execute trimming. If it is determined that the image processing unit 2000 does not include the trimming unit 2001, the procedure proceeds to step S2104, where the size update flag is turned off, and control is performed to not change the print image size Y 1117 of the print managing data. Then, the processing ends.

If, on the other hand, the CPU 103 determines in step S2102 that the image processing unit 2000 includes the trimming unit 2001, the procedure proceeds to step S2103, where the CPU 103 determines whether or not the trimming unit 2001 can be used for image processing for printing. If it is determined here that the trimming unit 2001 cannot be used for print processing, the procedure proceeds to step S2104, where control is performed to not change the print image size Y 1117 of the print managing data. Then, the processing ends.

If, on the other hand, the CPU 103 determines in step S2103 that the trimming unit can be used for print processing, the procedure proceeds to step S2105, where the CPU 103 saves the size information notified with the sheet size notification into the RAM 104. Then, the procedure proceeds to step S2106, where the CPU 103 sets the size update flag to on. Then, the processing ends.

Through the processing described above, even in the free size print mode, depending on the capability of the image processing unit, it is possible to consistently perform image processing and printing with the maximum size, without reflecting the result of the sheet size notification in the print managing data. In a case in which the sheet size is not reflected in the print managing data, however, under normal conditions, it is necessary to output all of the image data generated by the image processing unit 2000 to the printer unit 113. For this reason, in a case in which the size of the image data to be printed is greater than the actual sheet size, a situation may occur in which the control unit 115 outputs image data despite the fact that a sheet has passed through the discharge sensor 214 and a sheet discharge notification has been received from the engine controller 116. Accordingly, it is desirable to immediately stop printing of the image data even during the time when the image data is output if a sheet discharge notification is received.

Figure 22:
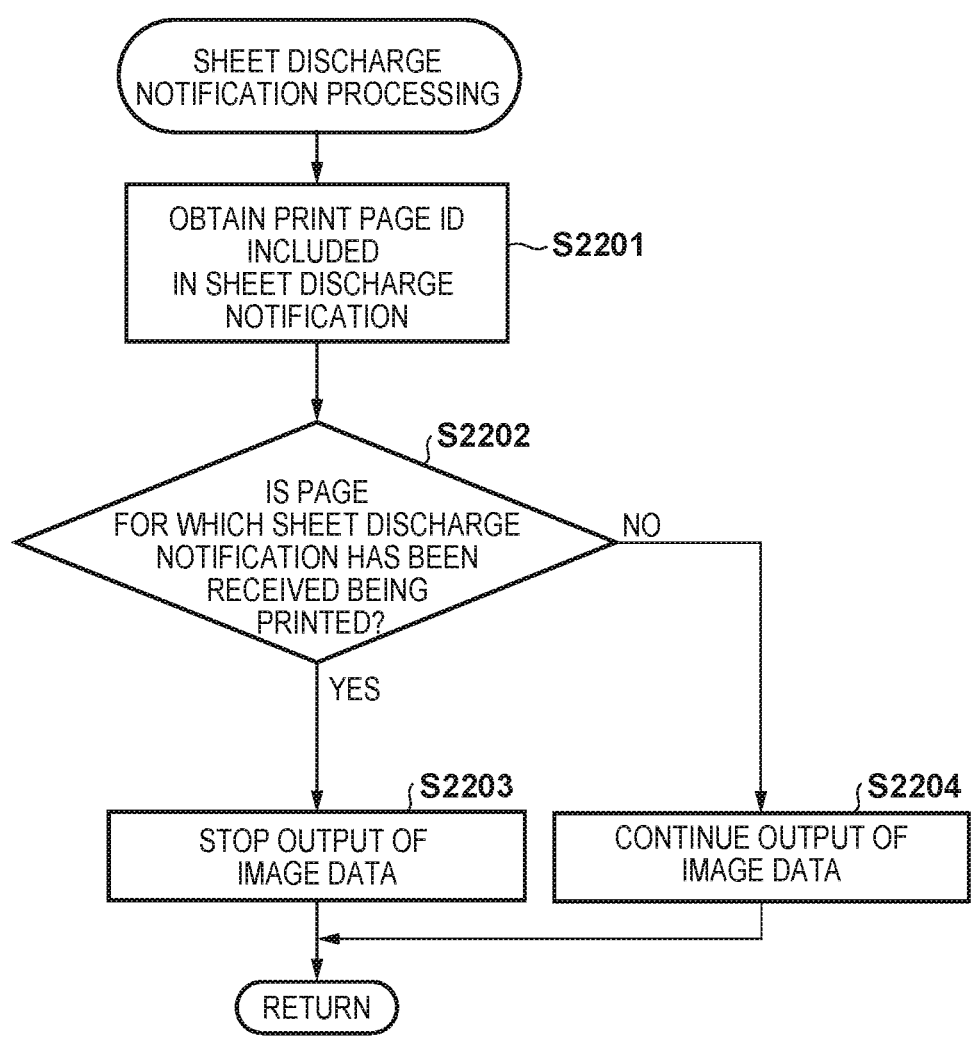
FIG. 22 is a flowchart for describing sheet discharge notification receiving processing performed by the MFP according to the second embodiment.

FIG. 22 is a flowchart for describing sheet discharge notification receiving processing performed by the MFP according to the second embodiment. The processing shown in the flowchart is achieved by the CPU 103 executing a program deployed from the storage unit 105 into the RAM 104.

First, in step S2201, the CPU 103 obtains the print page ID included in a control command of sheet discharge notification. Next, the procedure proceeds to step S2202, where the CPU 103 references to print managing data based on the print page ID and determines whether or not there is the same print page ID. If the same print page ID is found, furthermore, it is determined, based on whether the print instruction status of the print managing data of the print page indicates "synchronization signal received", whether the page is being printed. In step S2202, if the CPU 103 determines that the page for which the sheet discharge notification has been received is being printed, the procedure proceeds to step S2203, where processing is performed to interrupt the output of the image data so as to stop printing. In the stop processing, if there is image data that has not been output, the unoutput image data is deleted. If, on the other hand, the CPU 103 determines in step S2202 that the page for which the sheet discharge notification has been received is not being printed, the procedure proceeds to step S2204, where the output of the image data is continued so as to continue printing.

By performing control as described above, at the time when a sheet discharge notification is received, if the image data of the page for which the sheet discharge notification has been received is being output, the output of the image data is stopped and the image data is deleted. Accordingly, the time required to output image data can be reduced.

OTHER EMBODIMENTS

Embodiments of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

I claim:

1. A printing apparatus comprising:
a scanner that scans an original;
an image processor that performs image processing;
a printer that feeds a sheet from a manual sheet tray, detects a size of the fed sheet, sends size information of the detected size to a controller, and prints on the sheet; and
the controller that, in a print mode in which a size of a sheet to be fed from the manual sheet tray is not designated by a user,
(A) receives, from the scanner, first, second and third images respectively corresponding to first, second and third originals scanned in this order by the scanner;
(B) starts to cause the image processor to process an entire part of the received first image, and to cause the printer to feed a first sheet from the manual sheet tray;
(C) before receiving the size information of the detected size of the first sheet fed from the printer, starts to cause the image processor to process an entire part of the received second image regardless of the size information of the detected size of the first sheet; and
(D) after receiving the size information of the detected size of the first sheet fed from the printer, starts to cause the image processor to extract a part corresponding to the detected size of the first sheet fed from an entire part of the received third image and process the extracted part of the received third image.

2. The printing apparatus according to claim 1, wherein the controller causes the image processor to process the first and second images of the first and second originals into images of the predetermined size and to process an image of the third original and succeeding originals into images of the detected size of the sheet.

3. The printing apparatus according to claim 2, wherein the controller causes the image processor to start the image processing on the image of the predetermined size of the second original before detecting a size of a sheet to be used in printing of the image of the first original.

4. The printing apparatus according to claim 1, further comprising a sheet conveying path for conveying a sheet from the manual sheet tray to a portion in which the printing is executed by the printer.

5. The printing apparatus according to claim 4, wherein the size of a sheet is a length in a conveyance direction of the sheet conveyed on the sheet conveying path.

6. The printing apparatus according to claim 4, further comprising:
a timer that clocks a time; and
a sensor that detects a sheet on the sheet conveying path,
wherein the printing apparatus causes the timer to clock a time period that is from a time when the sensor detects a leading edge of a sheet conveyed on the sheet conveying path to a time when the sensor does not detect the sheet, and detects the length in the conveyance direction of the sheet conveyed on the sheet conveying path based on the time period and a conveying speed of the sheet.

7. The printing apparatus according to claim 1, further comprising an interface that sets a print mode in which a size of a sheet to be fed from the manual sheet tray in printing is not designated.

8. The printing apparatus according to claim 1, wherein the controller determines whether or not the image processor has a predetermined capability, and
in a case the controller determines that the image processor does not have the predetermined capability, the controller controls to cause the image processor to process the image received from the scanner by scanning of the original at the predetermined size even after the size of the sheet to be used in printing has been detected.

9. The printing apparatus according to claim 8, wherein the predetermined capability is a capability of trimming.

10. The printing apparatus according to claim 8, wherein when a sheet on which an image of one page of the original has been printed has passed a discharge sensor, the controller stops printing of an image on which the image processing has performed and that is not printed when the sheet has passed the discharge sensor.

11. The printing apparatus according to claim 1, wherein when a sheet on which an image of one page of the original has been printed has passed a discharge sensor, the controller stops printing of an image on which the image processing has performed and that is not printed when the sheet has passed the discharge sensor.

12. The printing apparatus according to claim 1, wherein the controller causes the image processor to process the entire part of the received first and second images without extracting an image corresponding to the detected size of the first sheet.

13. The printing apparatus according to claim 1, wherein the controller causes the image processor to process the image extracted from the received third image without processing un-extracted image of the received third image.

14. The printing apparatus according to claim 1, wherein the controller extracts an image corresponding to the detected size of the first sheet from each of received images following the third image, causes the image processor to process the extracted image, and causes the printer to print the processed image on sheets following the third sheet fed from the manual sheet tray.

15. The printing apparatus according to claim 1, wherein the print mode is a print mode that does not require a user to designate the size of the sheet to be fed from the manual sheet tray.

16. A method of controlling a printing apparatus having a scanner that scans an original, a printer that feeds a sheet from a manual sheet tray, detects a size of the fed sheet, sends size information of the detected size to a controller, and prints on a sheet, and an image processor that performs image processing, the method comprising:

in a print mode in which a size of a sheet to be fed from the manual sheet tray is not designated, receiving from the scanner first, second and third images respectively corresponding to first, second and third originals scanned in this order by the scanner;

starting to cause the image processor to process an entire part of the received first image, and causing the printer to feed a first sheet from the manual sheet tray;

before receiving the size information of the detected size of the first sheet fed from the printer, starting to cause the image processor to process an entire part of the received second image regardless of the size information of the detected size of the first sheet; and after receiving the size information of the detected size of the first sheet fed from the printer, starting to cause the image processor to extract a part corresponding to the detected size of the first sheet fed from an entire part of the received third image and process the extracted part of the received third image.

17. A printing apparatus comprising:
a scanner that scans an original;
an image processor that performs image processing;
a printer that feeds a sheet from a manual sheet tray, detects a length of the fed sheet, sends length information of the detected length to a controller, and prints on the sheet; and the controller that, in a print mode in which a length in the sheet conveying direction of a sheet to be fed from the manual sheet tray is not designated by a user, (A) receives from the scanner, first, second and third images respectively corresponding to first, second and third originals scanned in this order by the scanner;

(B) starts to cause the image processor to process an entire part of the received first image, and to cause the printer to feed a first sheet from the manual sheet tray;

(C) before receiving the length information of the detected length of the first sheet fed from the printer, starts to cause the image processor to process an entire part of the received second image regardless of the length information of the detected length of the first sheet; and (D) after receiving the length information of the detected length of the first sheet fed from the printer, starts to cause the image processor to extract a part corresponding to the detected length of the first sheet fed from an entire part of the received third image and process the extracted part of the received third image.

18. The printing apparatus according to claim 17, wherein the controller causes the image processor to process the entire part of the received first and second images without extracting an image corresponding to the detected length in the sheet conveying direction of the first sheet.

19. The printing apparatus according to claim 17, wherein the controller causes the image processor to process the image extracted from the received third image without processing an un-extracted image of the received third image.

20. The printing apparatus according to claim 17, wherein the controller extracts an image corresponding to the detected length in the sheet conveying direction of the first sheet from each of received images following the third image, causes the image processor to process the extracted image, and causes the printer to print the processed image on sheets following the third sheet fed from the manual sheet tray.

21. The printing apparatus according to claim 17, wherein the print mode is a print mode that does not require a user to designate the length in the sheet conveying direction of the sheet to be fed from the manual sheet tray.

* * * * *